United States Patent
Sekita

(10) Patent No.: US 11,178,290 B2
(45) Date of Patent: Nov. 16, 2021

(54) IMAGE FORMING APPARATUS AND METHOD ADJUSTING IMAGE FORMING POSITIONS ON FIRST AND SECOND SIDES OF RECORDING MEDIUM DEPENDING ON ADHESION AMOUNTS BASED ON READING TEST CHARTS

(71) Applicant: Daiki Sekita, Kanagawa (JP)

(72) Inventor: Daiki Sekita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/179,370

(22) Filed: Feb. 18, 2021

(65) Prior Publication Data

US 2021/0274051 A1    Sep. 2, 2021

(30) Foreign Application Priority Data

Feb. 28, 2020 (JP) .............................. JP2020-034106

(51) Int. Cl.
*H04N 1/00* (2006.01)
*H04N 1/23* (2006.01)

(52) U.S. Cl.
CPC ....... *H04N 1/00082* (2013.01); *H04N 1/0009* (2013.01); *H04N 1/00031* (2013.01); *H04N 1/00045* (2013.01); *H04N 1/00068* (2013.01); *H04N 1/00798* (2013.01); *H04N 1/2346* (2013.01)

(58) Field of Classification Search
None
See application file for complete search history.

(56) References Cited

U.S. PATENT DOCUMENTS

| 7,865,093 B2 * | 1/2011 | Okamoto ........... G03G 15/5025 399/38 |
| 2017/0131671 A1 | 5/2017 | Nishimura et al. |
| 2018/0241896 A1 | 8/2018 | Watanabe et al. |
| 2018/0251328 A1 | 9/2018 | Karikusa et al. |
| 2019/0171137 A1 | 6/2019 | Kobayashi |
| 2019/0027821 A1 | 9/2019 | Sekita |

FOREIGN PATENT DOCUMENTS

| JP | 2018-124455 | 8/2018 |
| JP | 2019-101326 | 6/2019 |

* cited by examiner

*Primary Examiner* — Scott A Rogers

(74) *Attorney, Agent, or Firm* — Duft & Bornsen, PC

(57) ABSTRACT

An image forming apparatus includes an image forming unit to perform an image forming process of forming a plurality of test charts having different adhesion amounts of an image forming material on a recording medium. The image forming process includes a transfer process of transferring the image forming material to image forming positions on the recording medium. The image forming apparatus further includes an image reading unit, circuitry, and a storage unit. The image reading unit reads each of the plurality of test charts. The circuitry calculates adjustment values for adjusting images formed at the image forming positions on a first side and a second side of the recording medium depending on adhesion amounts of the image forming material on the first side and the second side based on a reading result of the plurality of test charts by the image reading unit. The storage unit stores the adjustment values.

7 Claims, 18 Drawing Sheets

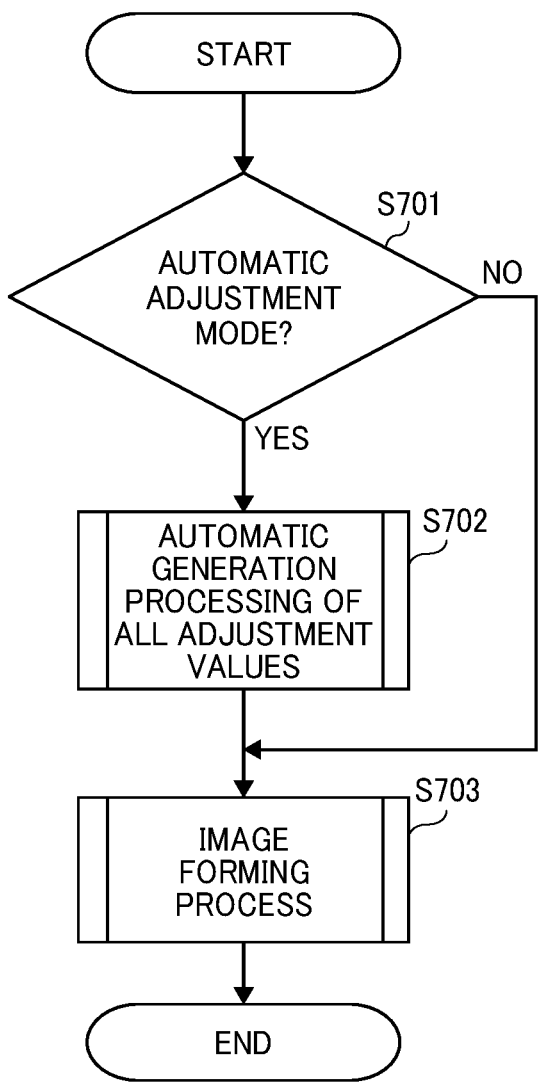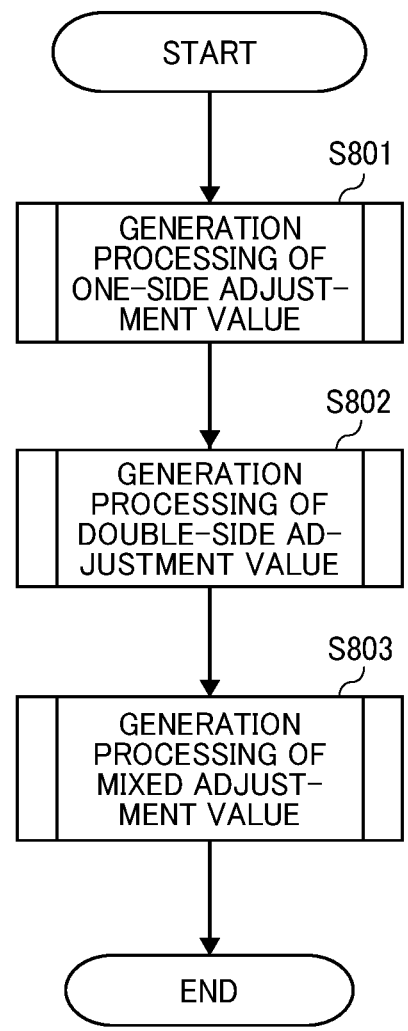

| MODE | ADJUSTMENT VALUE | | |
|---|---|---|---|
| | FIRST SIDE | SECOND SIDE | FRONT AND BACK SIDES |
| FIRST ONE-SIDE | ..... | | |
| SECOND ONE-SIDE | ..... | | |
| FIRST DOUBLE-SIDE | ..... | ..... | ..... |
| SECOND DOUBLE-SIDE | ..... | ..... | ..... |
| THIRD DOUBLE-SIDE | ..... | ..... | ..... |
| FOURTH DOUBLE-SIDE | ..... | ..... | ..... |
| MIXED | ..... | ..... | ..... |

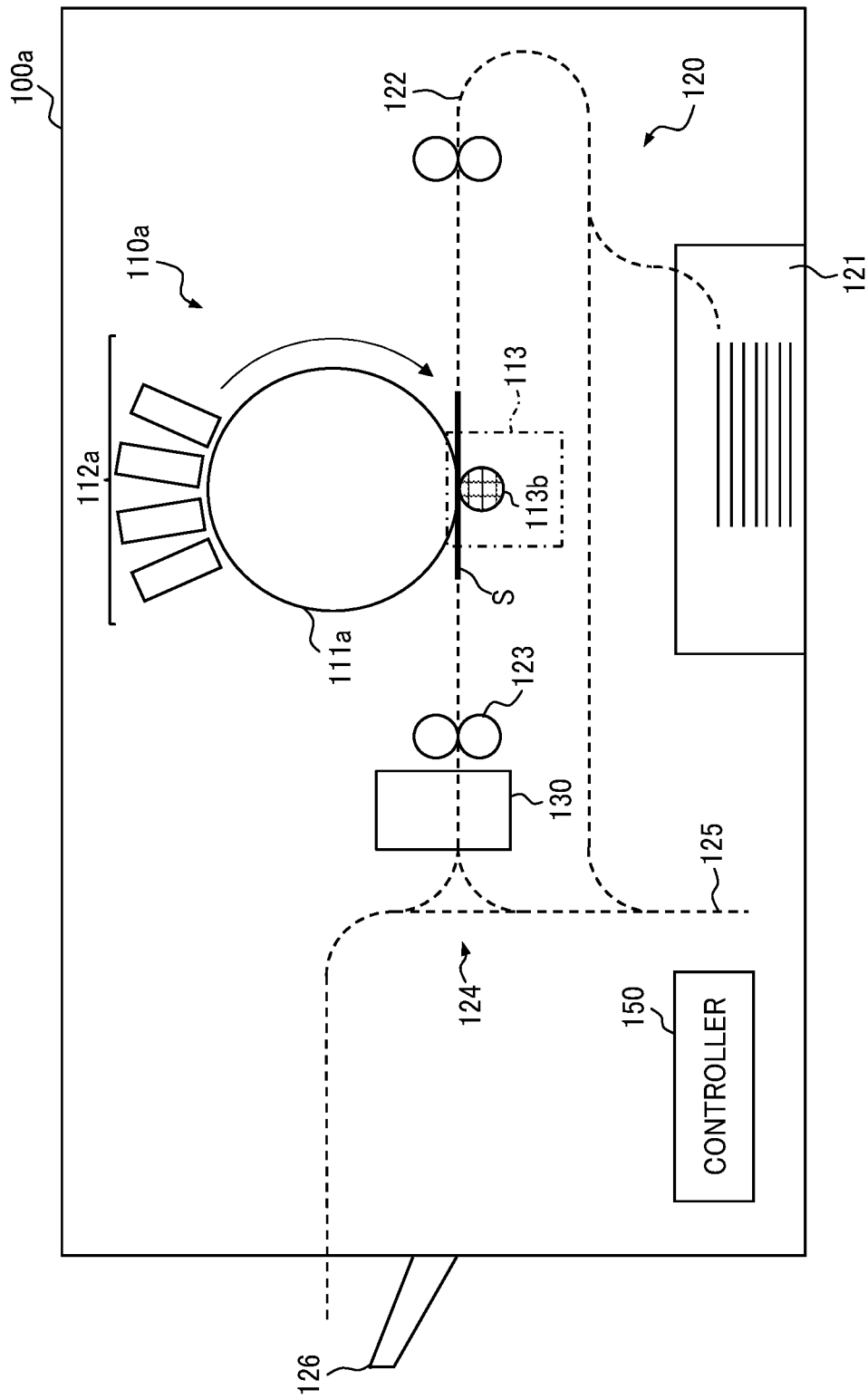

IMAGE FORMING APPARATUS AND METHOD ADJUSTING IMAGE FORMING POSITIONS ON FIRST AND SECOND SIDES OF RECORDING MEDIUM DEPENDING ON ADHESION AMOUNTS BASED ON READING TEST CHARTS

CROSS-REFERENCE TO RELATED APPLICATION

This patent application is based on and claims priority pursuant to 35 U.S.C. § 119(a) to Japanese Patent Application No. 2020-034106, filed on Feb. 28, 2020, in the Japan Patent Office, the entire disclosure of which is hereby incorporated by reference herein.

BACKGROUND

Technical Field

Embodiments of the present disclosure relate to an image forming apparatus and an image forming method.

Description of the Related Art

In recent years, many image forming apparatuses have been known that employ a technique for improving the accuracy of image formation on a recording medium. As one type thereof, there is known a technique of calculating an adjustment value used for adjustment of image forming process by using a recording medium on which a dedicated image (hereinafter referred to as a "test chart") is formed. The adjustment value is calculated as a value for canceling a "deviation" obtained by comparing a specific image scanned from the test chart with an image corresponding to ideal image formation after the test chart is formed by the image forming process. An image forming material that is used for actual image formation is also used when the test chart is formed on the recording medium.

An image forming apparatus that forms images on both sides (front side and back side) of a sheet-shaped recording medium is also known. The "deviation" in image formation occurs due to various causes, and one of the causes includes the amount of the image forming material adhering to the recording medium (i.e., the adhesion amount of the image forming material) during the actual image formation. That is, when the adhesion amount of the image forming material is different, the amount of the deviation may be different.

SUMMARY

Embodiments of the present disclosure describe an improved image forming apparatus that includes an image forming unit to perform an image forming process of forming a plurality of test charts having different adhesion amounts of an image forming material on a recording medium. The image forming process includes a transfer process of transferring the image forming material to image forming positions on the recording medium. The image forming apparatus further includes an image reading unit, circuitry, and a storage unit. The image reading unit reads each of the plurality of test charts. The circuitry calculates adjustment values for adjusting images formed at the image forming positions on a first side and a second side of the recording medium depending on adhesion amounts of the image forming material on the first side and the second side based on a reading result of the plurality of test charts by the image reading unit. The storage unit stores the adjustment values.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is a flowchart illustrating a flow of the operation of the printer according to an embodiment of the present disclosure;

FIG. 8 is a flowchart illustrating a detailed flow of the operation of the printer according to an embodiment of the present disclosure;

FIG. 18 is an example of an adjustment value table according to an embodiment of the present disclosure; and FIG. 19 is a schematic diagram illustrating an overall configuration of another printer according to an embodiment of the present disclosure.

Figure 1:
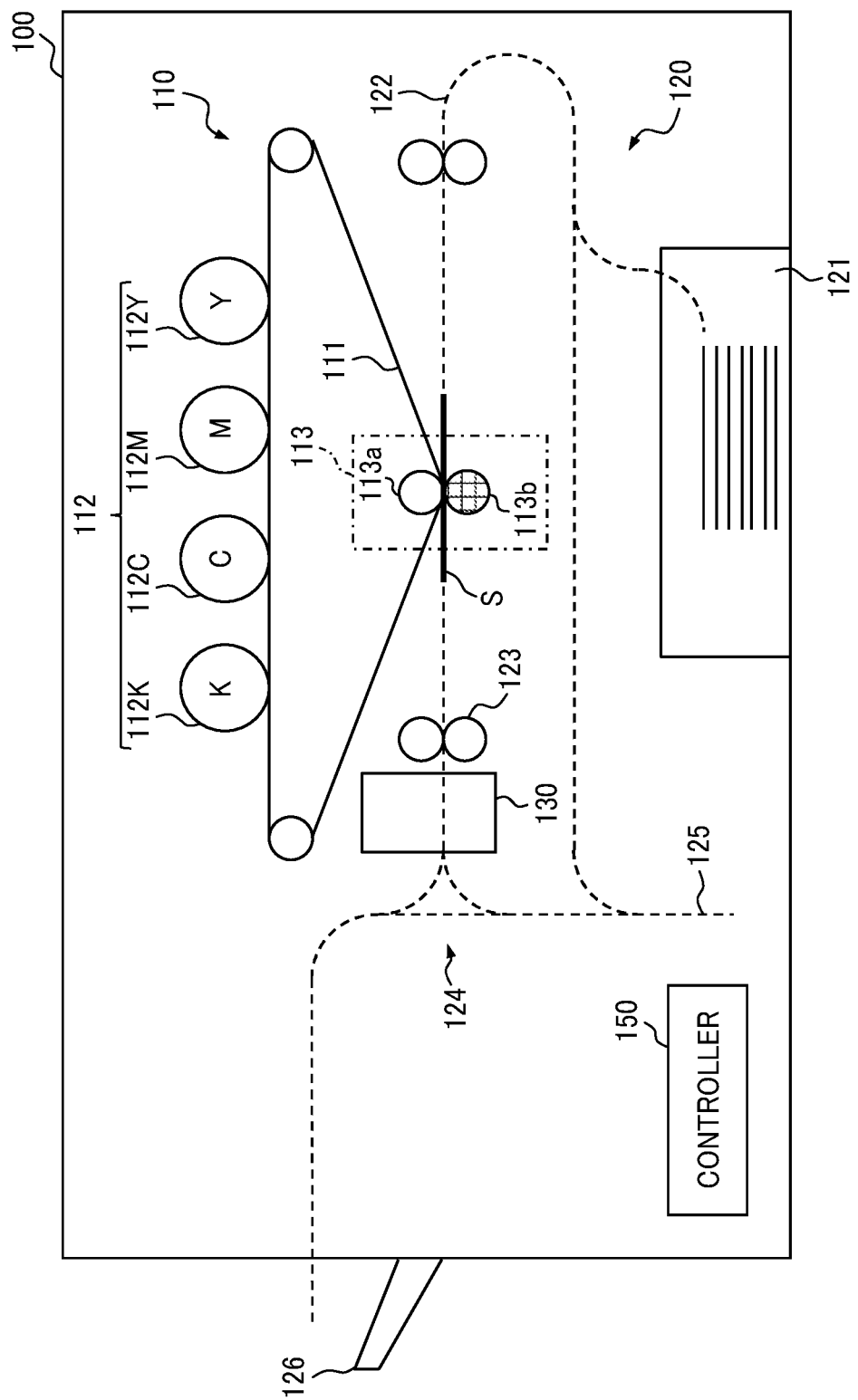
FIG. 1 is a schematic diagram illustrating an overall configuration of a printer according to an embodiment of the present disclosure.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

As used herein, the singular forms "a", "an", and "the" are intended to include the plural forms as well, unless the context clearly indicates otherwise.

It is to be noted that the suffixes Y, M, C, and K attached to each reference numeral indicate only that components indicated thereby are used for forming yellow, magenta, cyan, and black images, respectively, and hereinafter may be omitted when color discrimination is not necessary or when the components are collectively referred to.

An image forming apparatus according to an embodiment of the present disclosure is described with reference to the drawings. The present disclosure is applicable to an image forming process including a "transfer process" of transferring images formed on one component to another component (member).

FIG. 1 is a schematic diagram illustrating an overall hardware configuration of a printer 100 according to the present embodiment. The printer 100 includes at least an image forming unit 110, a medium conveyance unit 120, an image reading unit 130, and a controller 150. The controller 150 as circuitry controls the overall operation of the printer 100 and a series of processes for forming an image on a sheet S as a sheet-shaped recording medium. The series of processes controlled by the controller 150 includes the transfer process of transferring an image onto the sheet S. More specifically, the transfer process includes a process of adjusting an image to be transferred to be close to an ideal state in the image formation area on the sheet S. The configuration and functions of the controller 150 are described in detail later.

In the image forming unit 110 according to the present embodiment, photoconductor drums 112Y, 112M, 112C, and 112K for forming latent images corresponding to images of respective colors are arranged so as to correspond to image forming processes using image forming materials of respective colors such as toners of yellow (Y), magenta (M), cyan (C), and black (K). That is, the printer 100 according to the present embodiment is a so-called "tandem type" printer.

The photoconductor drums 112 are arranged along an intermediate transfer belt 111 which is an endless belt included in a movement assembly. The intermediate transfer belt 111 is wound around at least one drive roller and a plurality of driven rollers, and moves between a primary transfer position where an image (toner image) developed on the photoconductor drum 112 is transferred and a secondary transfer position where the image (toner image) is transferred to the sheet S.

At the secondary transfer position, a transfer unit 113 including a transfer roller 113a and a counter roller 113b disposed opposite the transfer roller 113a. In the transfer unit 113, the toner image is transferred from the intermediate transfer belt 111 to the sheet S to form an image at a predetermined position (i.e., image forming position) on the sheet S. Between the transfer roller 113a and the counter roller 113b, a gap is formed through which the intermediate transfer belt 111 and the sheet S pass through while being nipped therebetween. The image is transferred onto the sheet S while the sheet S is conveyed in the conveyance direction (sub-scanning direction) while being nipped in the gap.

The medium conveyance unit 120 includes a supply tray 121, a conveyance path 122, a fixing roller pair 123, a conveyance path switching unit 124, and a reverse path 125. The supply tray 121 accommodates the sheet S. The conveyance path 122 is constructed of a plurality of roller pairs to convey the sheet S. The fixing roller pair 123 is disposed downstream from the transfer unit 113 in the conveyance direction.

When the image forming process is performed, under the predetermined control processing by the controller 150, the sheet S accommodated in the supply tray 121 is separated by a pickup roller, conveyed along the conveyance path 122, and reaches the transfer unit 113.

As the sheet S reaches the transfer unit 113, the transfer process is performed. That is, the sheet S is conveyed in the predetermined conveyance direction while being nipped between the surface of the intermediate transfer belt 111 and the counter roller 113b. The transfer roller 113a presses the intermediate transfer belt 111 toward the counter roller 113b. When the sheet S passes between the intermediate transfer belt 111 and the counter roller 113b, the image forming material on the surface of the intermediate transfer belt 111 is transferred onto the sheet S. In this transfer process, an image is formed on one side (first side) of the sheet S.

The sheet S having the image formed on the first side thereof is further conveyed, and the image is fixed by the fixing roller pair 123. Then, the sheet S is conveyed to the image reading unit 130 disposed downstream from fixing roller pair 123 in the conveyance direction. The configuration and function of the image reading unit 130 are described in detail later. The fixing roller pair 123 functions as a fixing unit that performs processing of fixing an image formed on the sheet S.

Figure 2A:
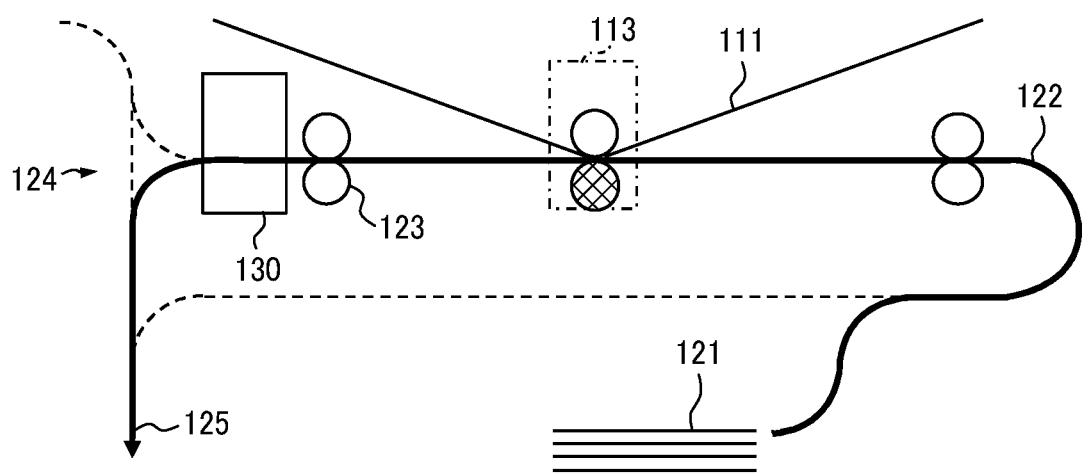
FIG. 2A is a schematic diagram illustrating a conveyance path of a recording medium when an image is printed on a first side of the recording medium according to an embodiment of the present disclosure.
Figure 2B:
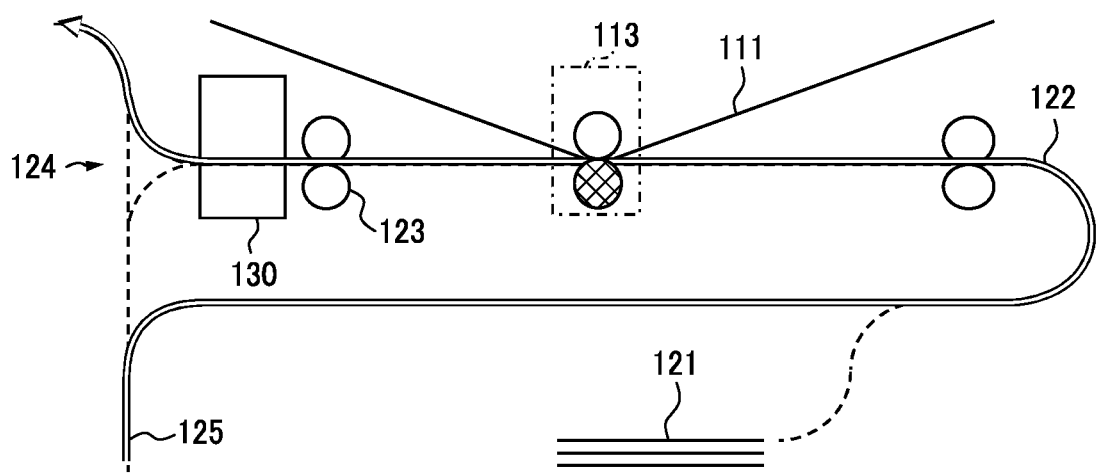
FIG. 2B is a schematic diagram illustrating a conveyance path of the recording medium when an image is printed on a second side of the recording medium according to an embodiment of the present disclosure.

The conveyance path 122 when an image is formed on the first side of the sheet S is illustrated in FIG. 2A. The conveyance path 122 when an image is also formed on the second side of the sheet S is illustrated in FIG. 2B.

When the image is also formed on the second side, the sheet S is conveyed to the reverse path 125 by the conveyance path switching unit 124. After that, the sheet S is conveyed again to the transfer position of the transfer roller 113a so that the image formed on the intermediate transfer belt 111 is transferred onto the second side of the sheet S. The sheet S that has passed through the image reading unit 130 is ejected to an output tray 126 via the conveyance path switching unit 124 if the image has already been formed on only the first side or the second side of the sheet S.

In the conveyance path 122 of the sheet S inside the printer 100, the image reading unit 130 scans each side of the sheet S conveyed from the image forming unit 110 and transmits the scanned image to the controller 150. The controller 150 calculates an adjustment value based on the scanned image. The image reading unit 130 includes a line sensor disposed in the conveyance path 122 of the sheet S.

Although the printer 100 illustrated in FIG. 1 is the electrophotographic image forming apparatus, an image forming apparatus to which the present disclosure is applicable is not limited to the electrophotographic type. For example, the present disclosure can also be applied to a so-called inkjet printer 100*a* as illustrated in FIG. 19. The inkjet printer 100*a* is an example of the image forming apparatus that discharges liquid ink (image forming material) to a predetermined component to form an image and transfers the image to a recording medium, thereby perform printing (image formation).

In the inkjet printer 100*a*, during the image forming process, under the control by the controller 150, the sheet S accommodated in the supply tray 121 is separated by the pickup roller, conveyed along the conveyance path 122, and reaches the transfer unit 113. In an image forming unit 110*a* of the inkjet printer 100*a*, recording heads 112*a* discharge the liquid ink (image forming material) of a plurality of colors to a conveyance drum 111*a*. After the sheet S has been reached the transfer unit 113, the sheet S is conveyed while being nipped between the surface of the conveyance drum 111*a* and the counter roller 113*b*, and the image forming material on the surface of the conveyance drum 111*a* is transferred onto the sheet S. Thus, an image is formed on the first side of the sheet S. The sheet S having the image formed on the first side thereof is further conveyed, and the sheet S is dried by the fixing roller pair 123. Then, the sheet S is conveyed to the image reading unit 130 disposed downstream from the fixing roller pair 123 in the conveying direction. Note that the fixing roller pair 123 may be omitted, or a heater that does not contact the sheet S may be provided to heat the sheet S instead of the fixing roller pair 123.

Figure 3:
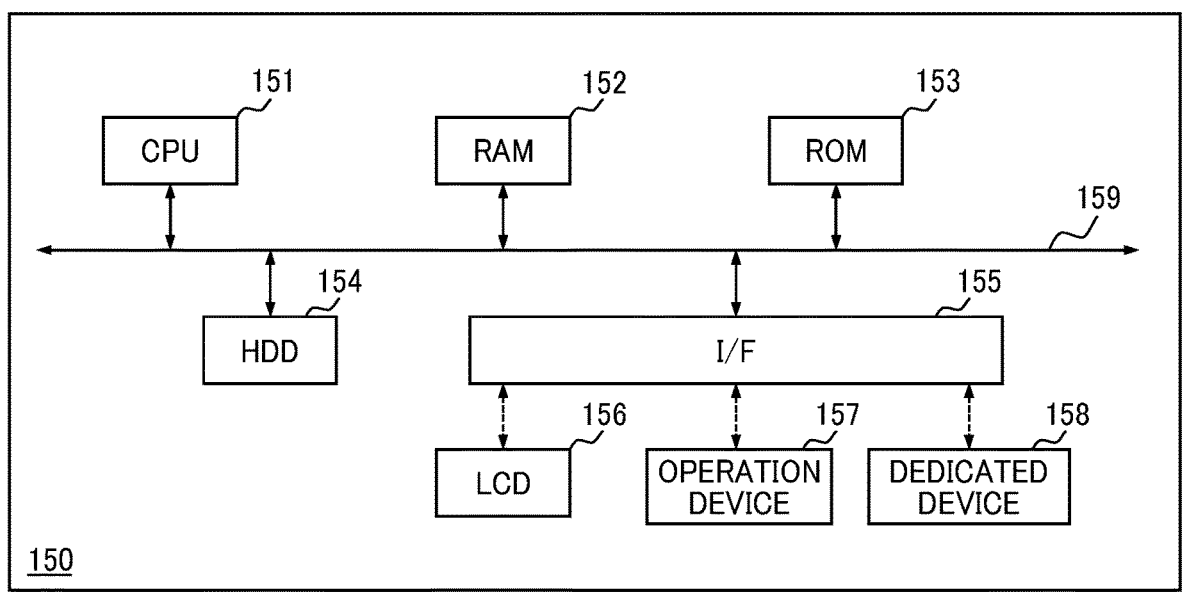
FIG. 3 is a block diagram illustrating a hardware configuration of a controller included in the printer according to an embodiment of the present disclosure.

A description is given below of a hardware configuration of the controller 150 according to the present embodiment with reference to FIG. 3. As illustrated in FIG. 3, the controller 150 according to the present embodiment has a configuration similar to that of a typical data processor such as a personal computers (PC) and a server. That is, the controller 150 includes a central processing unit (CPU) 151, a random access memory (RAM) 152, a read only memory (ROM) 153, a hard disk drive (HDD) 154, and an interface (I/F) 155, which are connected to each other via a bus 159. A liquid crystal display (LCD) 156, an operation device 157, and a dedicated device 158 may be connected to the I/F 155.

The CPU 151 is an arithmetic device and controls the overall operations of the printer 100. The RAM 152 is a volatile storage medium in which data is read and written at high speed and used as a working area when the CPU 151 processes data. The ROM 153 is a non-volatile read only storage medium and stores programs such as firmware. The HDD 154 is a non-volatile storage medium, in which data is read and written, stores an operating system (OS), various control programs, application programs, and the like.

The I/F 155 connects the bus 159 to various hardware components or networks for control. The LCD 156 is, for example, a visual user interface for users to confirm the operation state of the printer 100. The operation device 157 is a user interface, such as a keyboard and a mouse, for users to input data to the printer 100.

The dedicated device 158 is hardware for implementing a dedicated function in the printer 100. For example, the dedicated device 158 includes a conveyance mechanism and image formation and transfer configurations by the image forming unit 110, the medium conveyance unit 120, and the image reading unit 130. The conveyance mechanism conveys a sheet S as a target of an image formation output to a predetermined position. The image formation and transfer configurations perform output to attach the image forming material to the sheet S. The dedicated device 158 further includes a mechanism for reading a test chart formed on the sheet S and generating an adjustment value.

The controller 150 is not limited to the internal structure of the printer 100 and may be an external device (control device) having the same configuration and function as the internal structure of the printer 100. Alternatively, the controller 150 may be an application specific integrated circuit (ASIC) including a dedicated arithmetic device for performing image processing at high speed. The hardware configuration of the image reading unit 130 to be described later may include similar configuration and function to the controller 150. In such a case, the image reading unit 130 may be an independent device and may include a sensor for scanning an image formed on the sheet S.

In such a hardware configuration, a program stored in a non-volatile storage medium such as the ROM 153 or the HDD 154 is loaded in the RAM 152, and the CPU 151 executes arithmetic processing according to the program, thereby implementing a software controller described later. The combination of the software controller thus implemented and the hardware configuration constructs a functional block for executing predetermined processing in the printer 100 according to the present embodiment.

Figure 4:
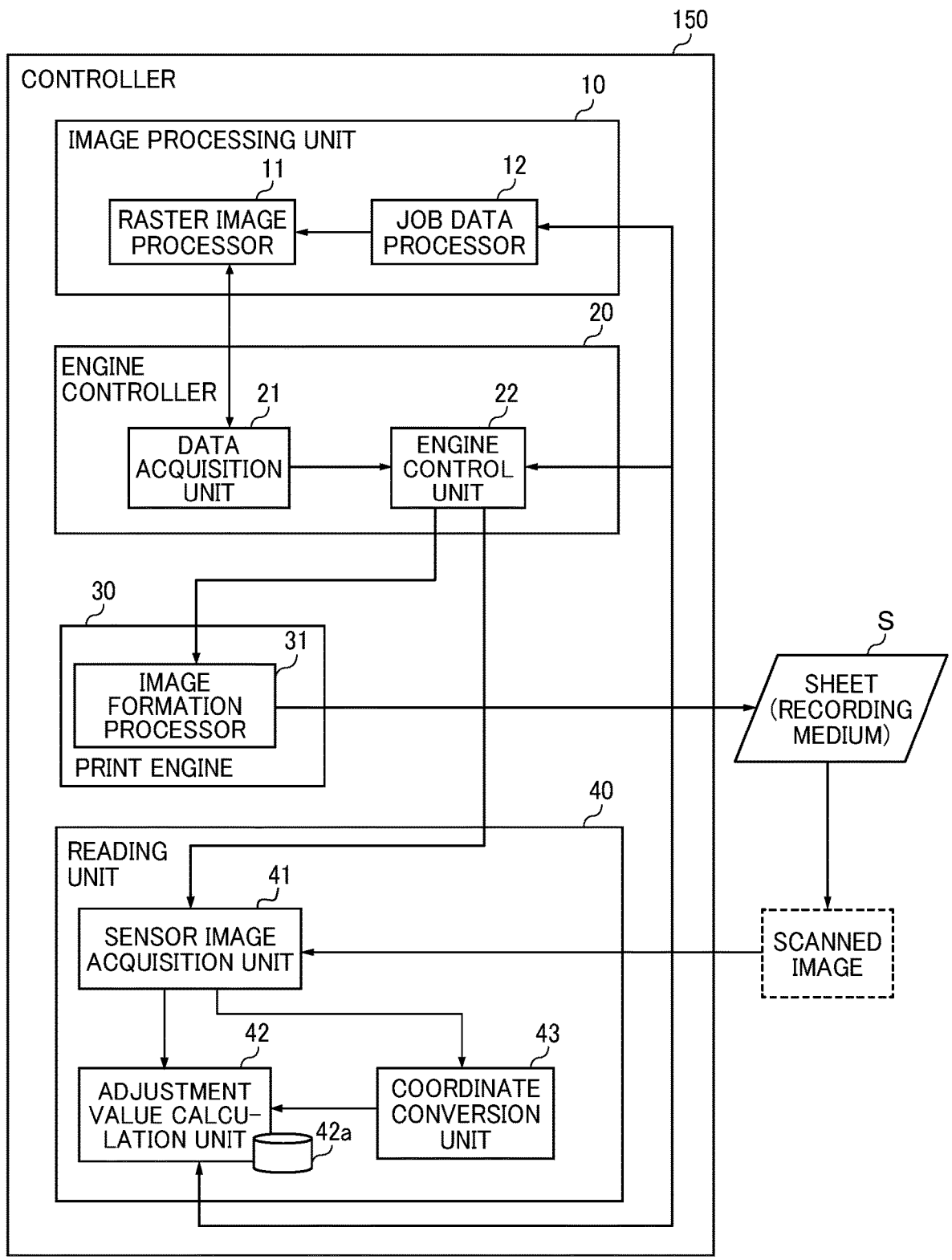
FIG. 4 is a block diagram illustrating a functional configuration of the controller according to an embodiment of the present disclosure.

FIG. 4 is a block diagram illustrating a functional configuration of the printer 100 according to the present embodiment. As illustrated in FIG. 4, the printer 100 according to the present embodiment includes an image processing unit 10 and an engine controller 20. A print engine 30 includes an image formation processor 31. A reading unit 40 includes a sensor image acquisition unit 41, an adjustment value calculation unit 42, and a coordinate conversion unit 43. The image processing unit 10 includes a raster image processor (RIP) 11 and a job data processor 12.

The job data processor 12 controls the image formation output based on a print job input from the outside via a network or a print job generated from image data stored in the controller 150 by an operator. The RIP 11 generates bitmap data based on the image data included in the print job and transmits the generated bitmap data to the engine controller 20 when performing the image formation output. When generating the bitmap data, the RIP 11 generates the bitmap data for the print engine 30 to perform the image formation output based on the image data included in the print job. The bitmap data is information of each pixel included in an image to be formed and output.

The print engine 30 according to the present embodiment performs the image formation output based on a binary image for each of cyan, magenta, yellow, and key plate (CMYK). On the other hand, in general, image data included in a print job is a multivalued image in which one pixel is depicted in multiple gradations such as 256 gradations. Therefore, the RIP 11 converts the image data included in the print job from the multivalued image to a small value image, thereby generating binary bitmap data for each of CMYK.

A data acquisition unit 21 acquires the print job and the bitmap data from the image processing unit 10 and operates an engine control unit 22. The engine control unit 22 causes the print engine 30 to perform the image formation output based on the print job and the bitmap data transmitted from the data acquisition unit 21. The engine control unit 22 causes the reading unit 40 to perform a reading operation based on the print job transmitted from the data acquisition unit 21.

The image formation processor 31 acquires the bitmap data input from the engine controller 20, performs the image forming output on the sheet S, and outputs the sheet S on which an image is printed. The image formation processor 31 according to the present embodiment is implemented by a general image forming mechanism of an electrophotographic type but can be implemented by another image forming mechanism such as an inkjet type.

The reading unit 40 scans the sheet S passing through the image reading unit 130 based on control data such as the print job input from the engine control unit 22 and reads position detection marks P1 (see FIGS. 5A and 5B) formed on the sheet S.

The scanned image scanned by the image reading unit 130 is an image generated by optically scanning the sheet S on which the position detection marks P1 are formed. Therefore, the scanned image is an image indicating an output result by the image forming unit 110. The sensor image acquisition unit 41 of the reading unit 40 acquires the scanned image generated by reading the surface of the sheet S by the image reading unit 130. The scanned image acquired by the sensor image acquisition unit 41 is input to the adjustment value calculation unit 42 and the coordinate conversion unit 43 together with the print job when the scanned image is generated by the reading unit 40.

The adjustment value calculation unit 42 calculates an adjustment value for adjusting an image formed on the sheet S at the time of the image formation output based on the center coordinates CP (see FIGS. 5A and 5B) of the position detection marks P1 included in the scanned image acquired from the sensor image acquisition unit 41 and the coordinates of the edges of the sheet S.

The adjustment value calculation unit 42 calculates the adjustment value for adjusting the image formed on the sheet S based on the scanned image and the image data of the print job when the scanned image is generated. More specifically, the adjustment value calculation unit 42 calculates a difference between the positions (coordinates) of the position detection marks P1 included in the "scanned image" of the test chart read by the image reading unit 130 and ideal positions (ideal coordinates) obtained based on the image data of the print job. The adjustment value calculation unit 42 calculates the "adjustment value" as a value for canceling the calculated difference. After calculating a predetermined number of adjustment values based on the test chart under the same condition, the adjustment value calculation unit 42 calculates an average value of the differences and stores the average value in an adjustment value storage unit 42a. When images are formed on the first side and the second side of the sheet S, the adjustment value is used to adjust the respective images formed at the image forming positions.

The adjustment value calculation unit 42 adjusts the coordinates of the position detection marks P1 on the first side using the adjustment value of the first side obtained from the sheet S on which the predetermined test charts are formed on the first side and the second side. In addition, the adjustment value calculation unit 42 converts the position detection marks P1 on the second side into the coordinates corresponding to the first side, and calculates the difference between the first side coordinates and the second side coordinates. After calculating a predetermined number of the differences, the adjustment value calculation unit 42 calculates the average value of the differences. This difference value is referred to as a "transparent difference value" and is stored in the adjustment value storage unit 42a in association with the combination of the test chart on the first side and the test chart on the second side.

The adjustment value calculation unit 42 has a plurality of operation modes, such as a case of calculating an adjustment value corresponding to a mode designated by a user, a case of automatically calculating adjustment values for all modes that may be used in the printer 100, and a case of calculating only necessary adjustment values after the image forming process.

The adjustment value calculation unit 42 selects an adjustment value suitable for a print job to be processed from the adjustment values stored in the adjustment value storage unit 42a, and transmits the selected adjustment value to the job data processor 12 and the engine control unit 22. Thus, the optimum adjustment value for adjusting the position of the image formed on the sheet S is used in the image forming process.

The coordinate conversion unit 43 calculates the center coordinates CP of the position detection marks P1 detected by reading the position detection marks P1 formed on the first side of the sheet S and the coordinates of the edges of the sheet S. The position detection marks P1 are formed corresponding to four corners of the sheet S as described later. Therefore, the coordinate conversion unit 43 calculates the center coordinates CP of the position detection marks P1 at the four corners and the coordinates of the edges of the sheet S corresponding thereto with respect to the scanned image obtained by reading one side of one sheet S.

In addition, the coordinate conversion unit 43 converts a coordinate system into the coordinate system for the first side when the image formation output is performed on the second side. The data of the coordinates after the conversion is output to the adjustment value calculation unit 42 and used for calculating the adjustment value. With such a functional configuration, the printer 100 according to the present embodiment performs adjustment processing for adjusting the position of the image formed on the sheet S.

Next, a "test chart 200" for calculating the adjustment value used in the printer 100 is described with reference to examples illustrated in FIGS. 5A and 5B.

The test chart 200 is a recording medium on which the position detection marks P1 are formed at the four corners of the sheet S. The image forming material used for forming the test chart 200 is the same as the image forming material used for the actual image forming process. The position detection marks P1 are formed near the edges of the sheet S. The center coordinate CP of the position detection mark P1 is positioned at a distance D1 (i.e., the distance in the main scanning direction) away from the edge of the sheet S along the sub-scanning direction and at a distance D2 (i.e., the distance in the sub-scanning direction) away from the edge of the sheet S along the main scanning direction. The position detection mark P1 is formed in L-shape including a line segment along the edge of the sheet S in the main scanning direction and a line segment along the edge of the sheet S in the sub-scanning direction. The sub-scanning direction is the same as the conveyance direction of the sheet S indicated by arrow D in FIGS. 5A and 5B. An image formation area R is virtually set inside the position detection marks P1 in the sheet S, and actual images are formed in the image formation area R. Based on the center coordinates CP of the position detection marks P1 calculated from the scanned image obtained by reading the position detection marks P1, the adjustment value for correcting a deviation that occurs, in particular, in the transfer process among a series of processes of the image forming process can be calculated. The position detection marks P1 may be detected including the sub-scanning direction and the main scanning direction.

Figure 5A:
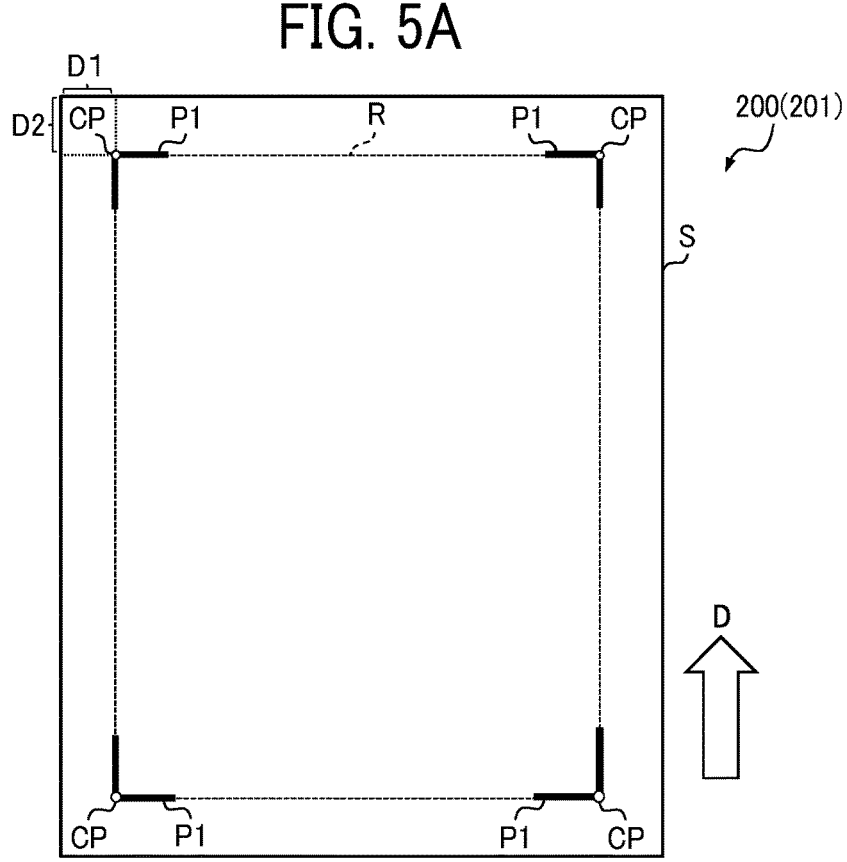
FIGS. 5A and 5B are schematic diagrams illustrating a configuration of position detection marks according to an embodiment of the present disclosure.
Figure 5B:
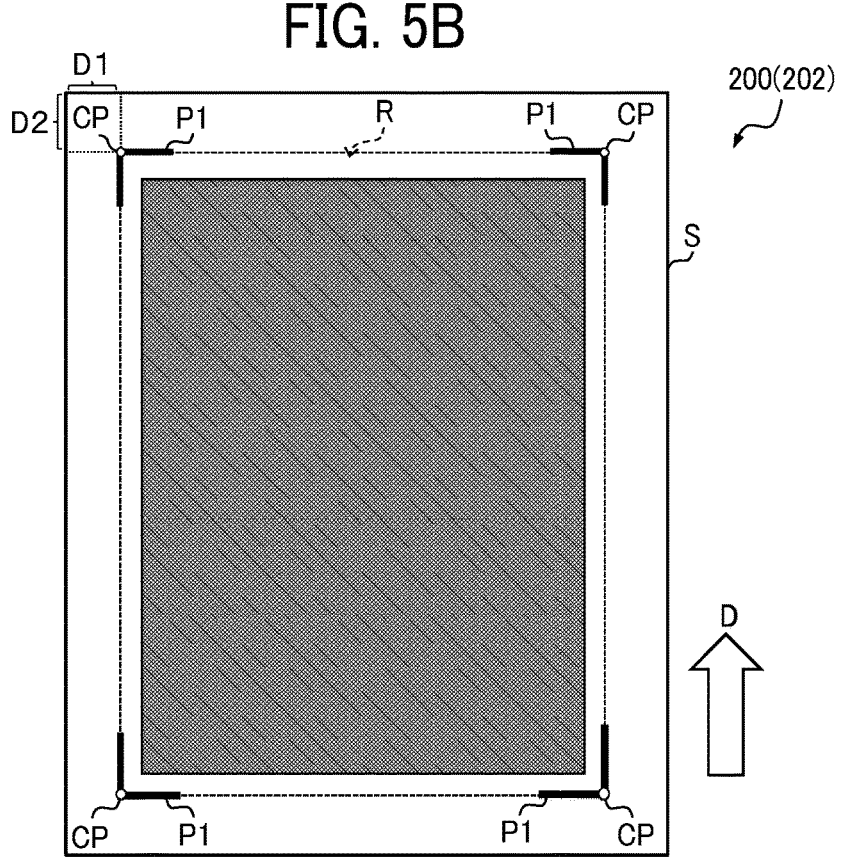

The test chart 200 according to the present embodiment includes a first test chart 201 illustrated in FIG. 5A and a second test chart 202 illustrated in FIG. 5B. In the first test chart 201, the position detection marks P1 are formed on the sheet S, and an image is not formed in the image formation area R. The amount of the image forming material used for forming the first test chart 201 is divided by the area of the image formation area R, thereby calculating the amount of the image forming material per unit area of the first test chart 201. This amount is referred to as an "adhesion amount of the image forming material" of the first test chart 201. Similarly, the adhesion amount of the image forming material of the second test chart 202 is also calculated.

The second test chart 202 includes a "solid image" in which the image forming material adheres to the entire image formation area R. In this case, the adhesion amount of the image forming material is assumed to be the maximum amount in the sheet S according to the present embodiment. On the other hand, the adhesion amount of the image forming material of the first test chart 201 is assumed to be the minimum amount in the sheet S according to the present embodiment.

When the first test chart 201 and the second test chart 202 are optically scanned, the center coordinates CP of the position detection marks P1 may be different due to the difference in the adhesion amount of the image forming material. Therefore, the first test chart 201 and the second test chart 202 are formed on one side and both sides of the sheet S, and the adjustment value is calculated for each of "combination patterns" that can be combined. According to this adjustment value, the image position can be adjusted when the adhesion amount of the image forming material of the image formed on the sheet S is the minimum (small) and when the adhesion amount of the image forming material is the maximum (large).

In addition, the image position can be adjusted when the adhesion amount of the image forming material of the image formed on the first side (or second side) of the sheet S is the minimum (small) and the adhesion amount of the image forming material of the image formed on the second side (or first side) of the sheet S is the maximum (large). That is, when the images are formed on both sides of the sheet S, the suitable adjustment value is used depending on the adhesion amount of the image forming material of the images formed on both surfaces. Accordingly, the relative deviation between both images (i.e., the deviation between the front side image and the back side image) can be alleviated particularly when the images are formed on both of the first side and the second side.

The adjustment value calculation unit 42 and the coordinate conversion unit 43 described above performs the adjustment processing for correcting the deviation of the image formed on the sheet S mainly in the sub-scanning direction based on the center coordinates CP of the position detection marks P1 and the coordinates of the edges of the four corners of the sheet S.

As described above, the printer 100 according to the present embodiment can calculate the adjustment value based on the adhesion amount of the image forming material using the plurality of types of test charts 200 having different adhesion amounts of the image forming material. In the above description, two types of test charts 200 having the different adhesion amounts of the image forming material are exemplified. However, a test chart applicable to the printer 100 is not limited thereto. For example, a test chart having the adhesion amount of the image forming material corresponding to an intermediate adhesion amount of image forming material between the first test chart 201 and the second test chart 202 may be used.

Figure 6A:
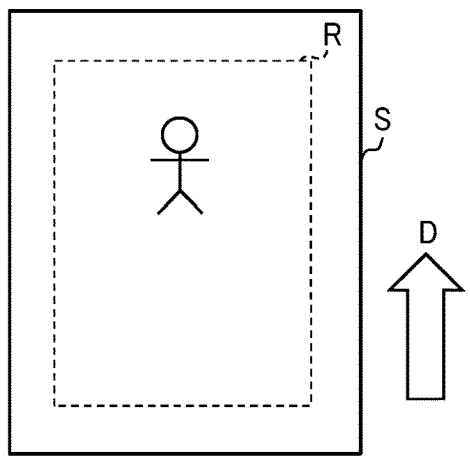
FIGS. 6A to 6C are schematic diagrams for explaining an effect of an adjustment value according to an embodiment of the present disclosure.
Figure 6B:
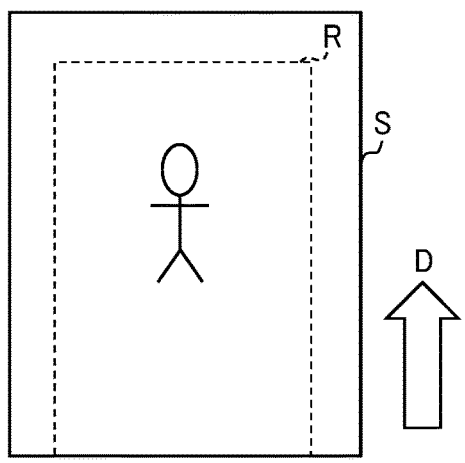
Figure 6C:
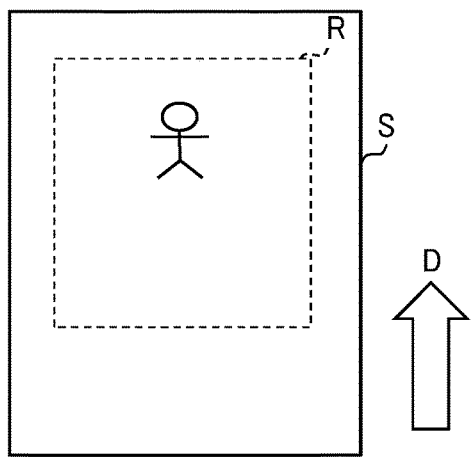

Here, the relation between the adhesion amount of the image forming material and the deviation of the image is described with reference to FIGS. 6A to 6C. FIG. 6A illustrates an image formed on the sheet S when the ideal adjustment is performed in the image forming process, in particular, when the adjustment according to the adhesion amount of the image forming material is performed in the transfer process. Here, the image illustrated in FIG. 6B is assumed to correspond to the image whose adhesion amount of the image forming material is large per unit area. In addition, it is assumed that the adjustment value (calculated in advance) that is applicable in the transfer process for forming the image illustrated in FIG. 6A is only the adjustment value corresponding to the image whose adhesion amount of the image forming material is small. Since a general test chart (similar to the first test chart 201) corresponds to the image whose adhesion amount of the image forming material is small, the adjustment value calculated in advance by the general technique only corresponds to the image whose adhesion amount of the image forming material is small.

In the image forming process, for example, when the image forming material is transferred from the intermediate transfer belt 111 to the sheet S in the transfer unit 113, if the adhesion amount of the image forming material is large, slip may slightly occur between the intermediate transfer belt 111 and the sheet S. Further, the stiffness of the sheet S may change. When the slip occurs or the stiffness changes, the relative speed of transfer from the intermediate transfer belt 111 to the sheet S may change due to the influence thereof. Since the conveyance speed of the sheet S is predetermined, when the relative speed between the intermediate transfer belt 111 and the sheet S changes, the image deforms on the downstream side in the sub-scanning direction (i.e., the conveyance direction of the sheet S indicated by arrow D in FIGS. 6A to 6C). This is referred to as "variation in the sub-scanning magnification". As a result of the variation in the sub-scanning magnification, for example, the image may extend in the sub-scanning direction as illustrated in FIG. 6B, or the image may contract in the sub-scanning direction as illustrated in FIG. 6C.

The printer 100 according to the present embodiment, as described later, uses the first test chart 201 and the second test chart 202 and calculates the adjustment values corresponding to the combination of the large adhesion amount and the small adhesion amount of the image forming material on the respective sides of the sheet S. Thus, these adjustment values can be used for the image formation. As a result, the image illustrated in FIG. 6A can be formed instead of the images illustrated in FIGS. 6B and 6C.

Next, an image forming method according to the present embodiment is described. The description according to the present embodiment concerns data processing executable under the control of the controller 150 in the printer 100. FIG. 7 is a flowchart of processing of a control program executed by the controller 150. First, when the image forming process is performed in the printer 100, the controller 150 determines whether or not the "automatic adjustment mode" is selected by a user via the operation device 157 (S701). The automatic adjustment mode is processing for automatically generating the "adjustment value" for adjusting the position of the image formed on the first side (and the second side) of the sheet S in the image forming process. When the "automatic adjustment mode" is not selected by the user via the operation device 157 (NO in S701), the controller 150 performs the image forming process (S703).

As illustrated in the adjustment value table 420 in FIG. 18, the adjustment value storage unit 42a separately stores a "first side adjustment value" used for adjustment of the first side, a "second side adjustment value" used for adjustment of the second side, and a "front and back sides adjustment value" used for alignment of the images between the first side and the second side for each image forming mode, such as a first one-side mode, a second one-side mode, a mixed mode, and the like. In step S701, the controller 150 also determines whether or not all of the adjustment values are stored in the adjustment value table 420. When the automatic adjustment mode is selected (YES in S701), the controller 150 executes automatic generation processing of all adjustment values (S702) and then performs the image forming process (S703).

FIG. 8 is a flowchart illustrating an overall flow of the automatic generation processing of all adjustment values. As illustrated in FIG. 8, the controller 150 executes generation processing of one-side adjustment value (S801). Next, the controller 150 executes generation processing of double-side adjustment value (S802). Subsequently, the controller 150 executes generation processing of mixed adjustment value (S803).

In the generation processing of one-side adjustment value (S801), the first test chart 201 or the second test chart 202 is formed only on one side (first side) of a sheet S, and the adjustment value of each of the first test chart 201 and the second test chart 202 is calculated. The calculated adjustment values are stored separately in the adjustment value storage unit 42a. For example, the adjustment value calculated from the first test chart 201 is referred to as a "first one-side adjustment value", and the adjustment value calculated from the second test chart 202 is referred to as a "second one-side adjustment value".

In the generation processing of double-side adjustment value (S802), the first test chart 201 or the second test chart 202 is formed on one side (first side) of a sheet S, and the first test chart 201 or the second test chart 202 is formed on the other side (second side) of the sheet S. Then, the adjustment value is calculated for each of a plurality of combination patterns in which one of the first test chart 201 and the second test chart 202 is formed on the first side of the sheet S and one of the first test chart 201 and the second test chart 202 is formed on the second side of the sheet S.

The combination patterns assumed here includes four patterns: "a pattern in which the first test chart 201 is formed on the first side and the second side" corresponding to a first double-side mode; "a pattern in which the first test chart 201 is formed on the first side and the second test chart 202 is formed on the second side" corresponding to a second double-side mode; "a pattern in which the second test chart 202 is formed on the first side and the first test chart 201 is formed on the second side" corresponding to a third double-side mode; and "a pattern in which the second test chart 202 is formed on the first side and the second side" corresponding to a fourth double-side mode. The adjustment values calculated corresponding to the respective combination patterns are stored separately in the adjustment value storage unit 42a.

In the generation processing of mixed adjustment value (S803), a "mixed adjustment value" is generated. When the adhesion amount of the image forming material is largely uneven in the image formed on the sheet S by the print job, the adjustment value generated in the generation processing of one-side adjustment value (S801) or the generation processing of double-side adjustment value (S802) may not effectively alleviate the deviation. In such a case, the mixed adjustment value is used. The mixed adjustment value is a median value calculated from the variation of the adjustment values based on the one-side adjustment value and the double-side adjustment value. That is, the generation processing of mixed adjustment value (S803) is executed based on the adjustment values generated previously.

Figure 9:
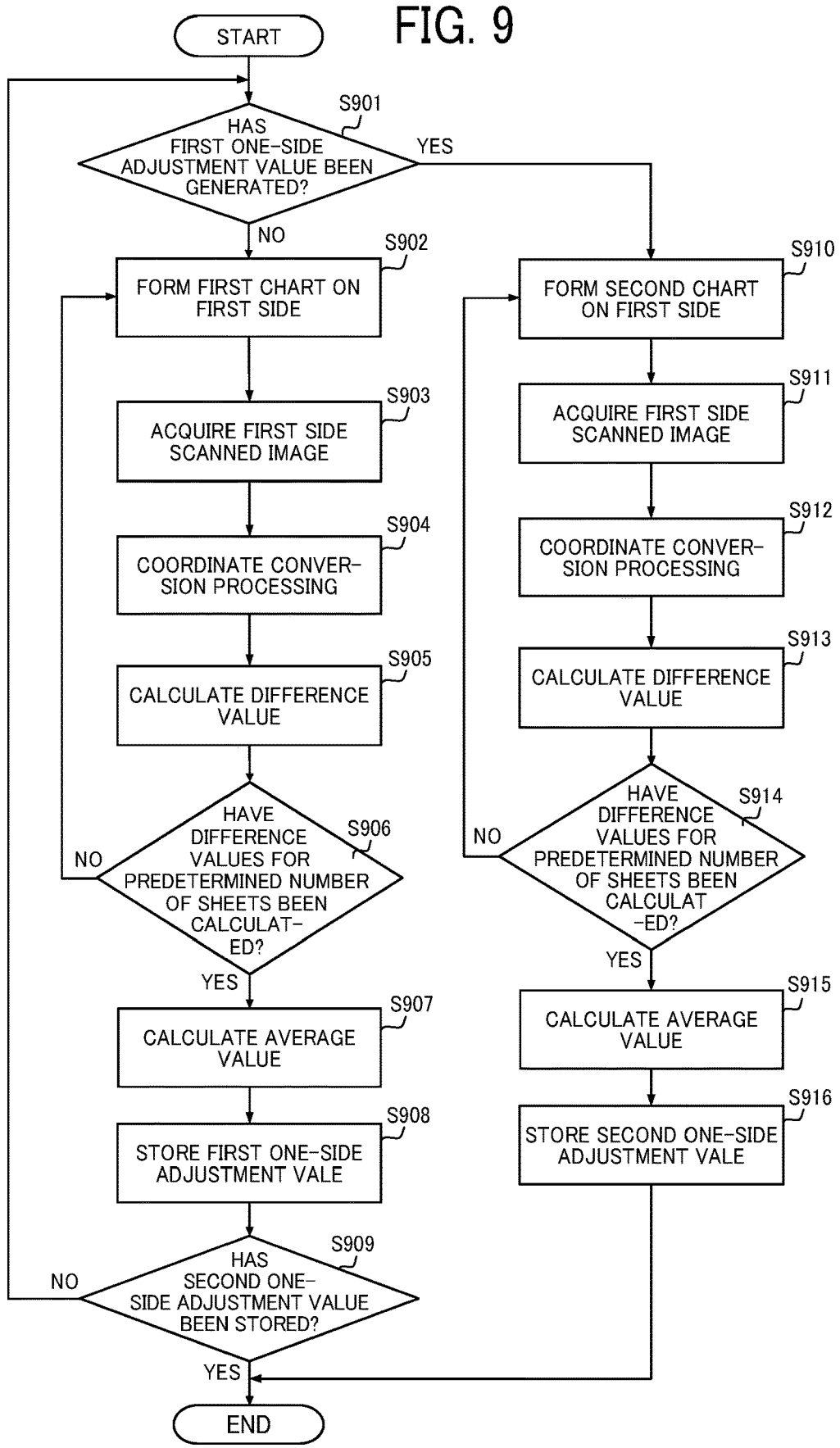
FIG. 9 is a flowchart illustrating a flow of generation processing of one-side adjustment value according to an embodiment of the present disclosure.

The generation processing of one-side adjustment value (S801) is described in detail with reference to FIG. 9. First, the controller 150 determines whether or not the first one-side adjustment value has already been calculated and stored in the adjustment value storage unit 42a (S901).

If the first one-side adjustment value has not been calculated (NO in S901), the image forming unit 110 forms the first test chart 201 on one side (first side) of the sheet S (S902), and the sensor image acquisition unit 41 reads the first test chart 201 (S903). The coordinate conversion unit 43 calculates the center coordinates CP of the position detection marks P1 included in the scanned image (S904). Subsequently, the adjustment value calculation unit 42 acquires data for calculating the ideal center coordinates CP from the job data processor 12 and calculates a difference value between the ideal center coordinates CP and the center coordinates CP obtained from the reading result (S905).

In order to calculate the adjustment value, a predetermined number of test charts 200 are used. Accordingly, the influence of the deviation that occurs instantaneously can be eliminated, thereby improving the accuracy of the deviation correction. After step S905, the controller 150 determines whether or not the difference values corresponding to a predetermined number of sheets S have been calculated (S906). If the difference values for the predetermined number of sheets S have not been calculated (NO in S906), the process returns to step S902. If the difference values for the predetermined number of sheets S have been calculated (YES in S906), the adjustment value calculation unit 42 calculates the average value of the difference values previously obtained (S907) and stores the average value in the adjustment value storage unit 42a as the first one-side adjustment value (S908).

Subsequently, if the second one-side adjustment value has already been stored in the adjustment value storage unit 42a (YES in S909), the generation processing of one-side adjustment value is terminated. If the second one-side adjustment value has not been stored in the adjustment value storage unit 42a (NO in S909), the process returns to step S901. In this case, since the first one-side adjustment value has already been calculated (YES in S901), the image forming unit 110 operates to form the second test chart 202 on one side (first side) of the sheet S (S910), and the image reading unit 130 reads the second test chart 202 (S911). The coordinate conversion unit 43 calculates the center coordinates CP of the position detection marks P1 included in the scanned image (S912). Subsequently, the adjustment value calculation unit 42 acquires data for calculating the ideal center coordinates CP from the job data processor 12 and calculates a difference value based on the acquired data (S913).

The subsequent process (i.e., steps S914 to S916) is similar to steps S906 to S908, and thus detailed description thereof is omitted. With these processes, the first one-side adjustment value for the small adhesion amount of the image forming material and the second one-side adjustment value for the large adhesion amount of the image forming material can be automatically stored in the adjustment value storage unit 42*a*, which are used during single-sided printing.

Figure 10:
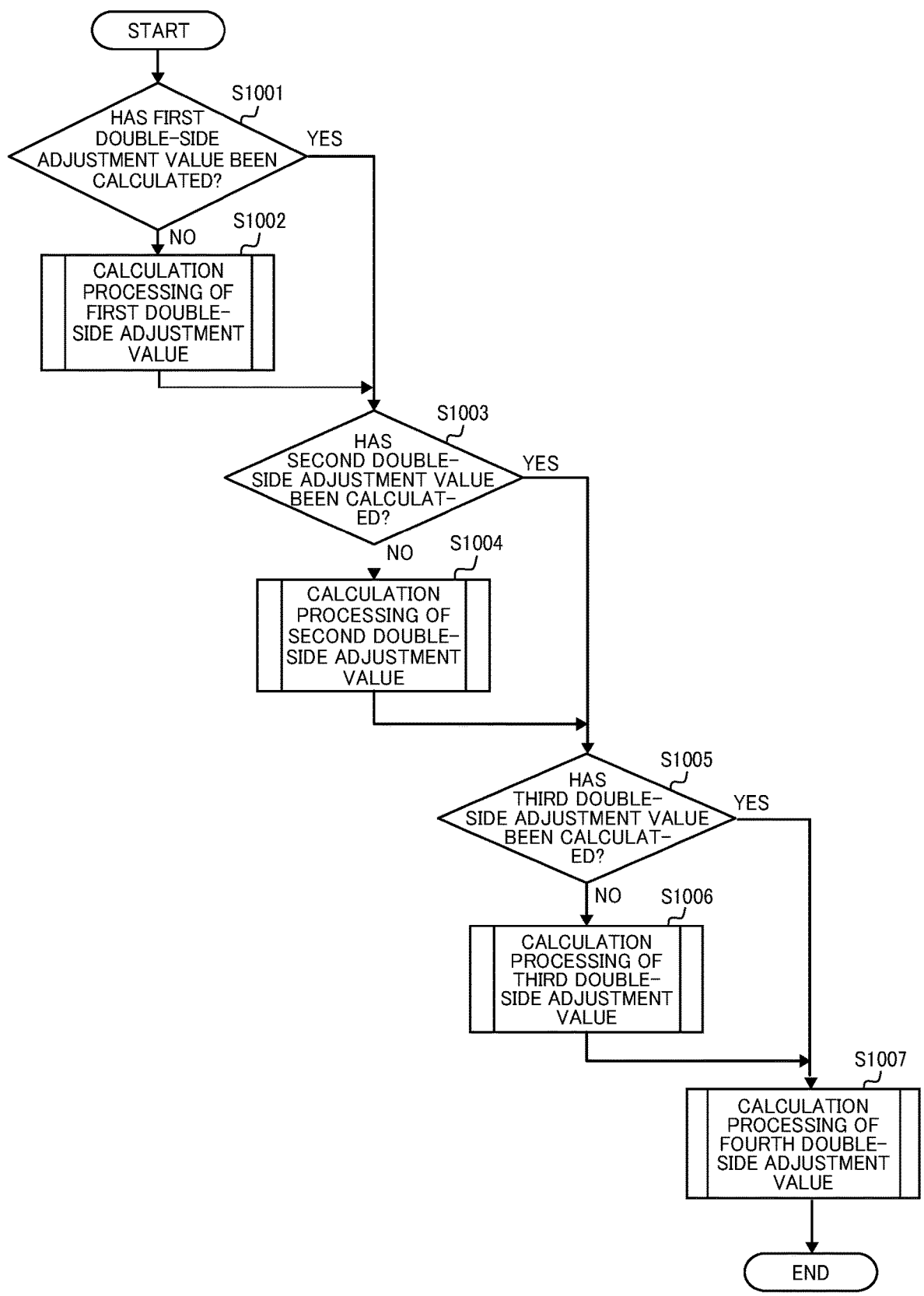
FIG. 10 is a flowchart illustrating a flow of generation processing of double-side adjustment value according to an embodiment of the present disclosure.

The generation processing of double-side adjustment value (S802) is described in detail with reference to FIG. 10. First, the controller 150 determines whether or not the first double-side adjustment value has already been stored in the adjustment value storage unit 42*a* (S1001). If the first double-side adjustment value has not been calculated (NO in S1001), the controller 150 executes the calculation processing of first double-side adjustment value (S1002).

If the first double-side adjustment value has been calculated (YES in S1001), the controller 150 determines whether or not the second double-side adjustment value has already been stored in the adjustment value storage unit 42*a* (S1003). If the second double-side adjustment value has not been calculated (NO in S1003), the controller 150 executes the calculation processing of second double-side adjustment value (S1004).

If the second double-side adjustment value has been calculated (YES in S1003), the controller 150 determines whether or not the third double-side adjustment value has already been stored in the adjustment value storage unit 42*a* (S1005). If the third double-side adjustment value has not been calculated (NO in S1005), the controller 150 executes the calculation processing of third double-side adjustment value (S1006). If the third double-side adjustment value has been calculated (YES in S1005), the controller 150 executes the calculation processing of fourth double-side adjustment value (S1007).

As described above, in the generation processing of double-side adjustment value, the adjustment value corresponding to each of the combination patterns is calculated in association with the combination of the test charts 200 having the different adhesion amounts of the image forming material.

Figure 11:
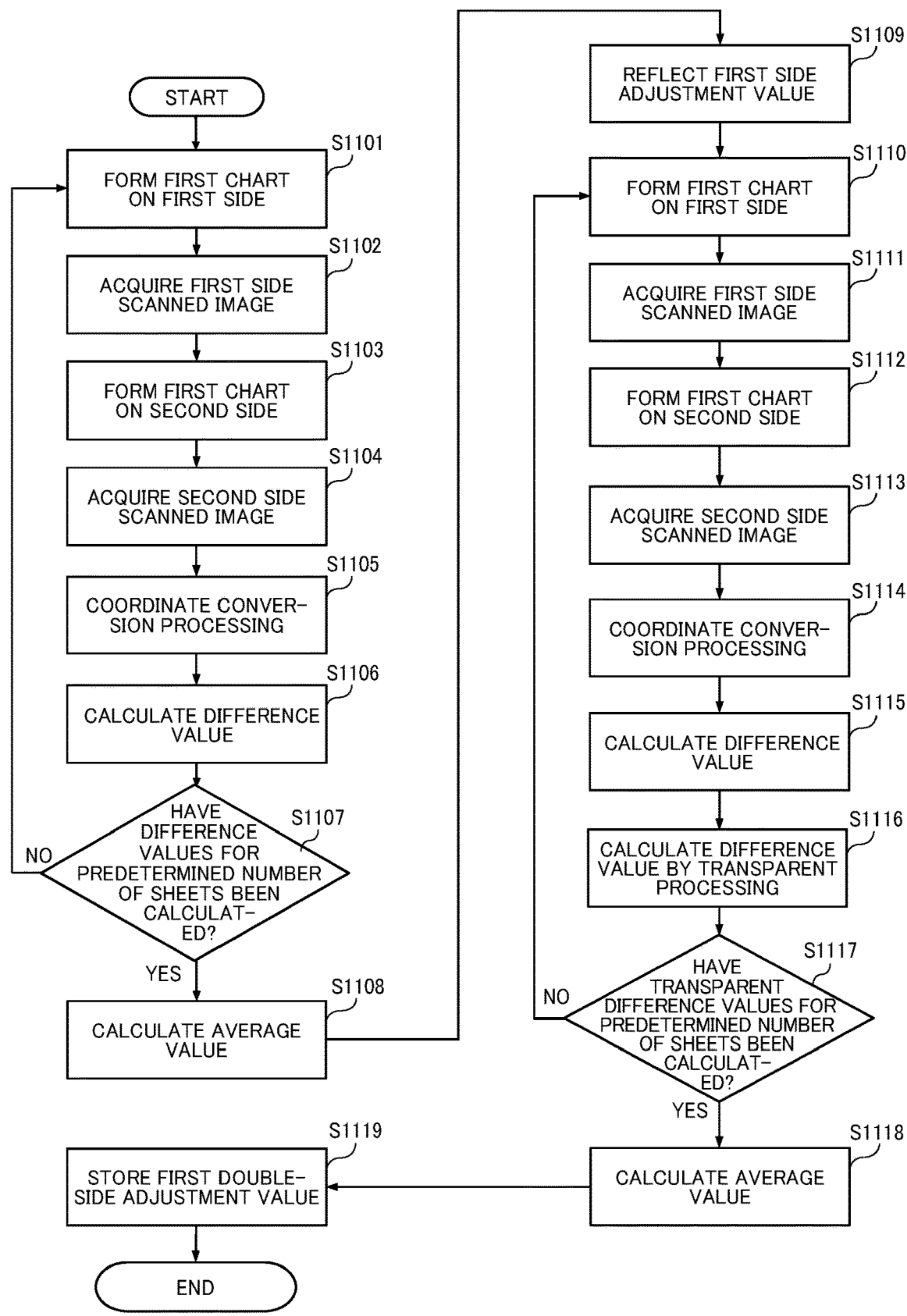
FIG. 11 is a flowchart illustrating a detailed flow of the generation processing of double-side adjustment value according to an embodiment of the present disclosure.

The calculation processing of first double-side adjustment value (S1002) is described in detail with reference to a flowchart in FIG. 11. First, the image forming unit 110 forms the first test chart 201 on the first side of a sheet S (S1101), and the image reading unit 130 reads the first test chart 201 formed on the first side (S1102). Next, the image forming unit 110 forms the first test chart 201 on the second side of the same sheet S (the first test chart 201 is formed on the first side of the same sheet S) (S1103), and the image reading unit 130 reads the first test chart 201 formed on the second side (S1104). The coordinate conversion unit 43 calculates the center coordinates CP of the position detection marks P1 included in each scanned image (S1105).

Subsequently, the adjustment value calculation unit 42 acquires data for calculating the ideal center coordinates CP from the job data processor 12 and calculates a difference value of the first side and the second side based on the acquired data (S1106).

After step S1106, the controller 150 determines whether or not the difference values corresponding to a predetermined number of sheets S have been calculated (S1107). If the difference values for the predetermined number of sheets S have not been calculated (NO in S1107), the process returns to step S1101. If the difference values for the predetermined number of sheets S have been calculated (YES in S1107), the adjustment value calculation unit 42 calculates the average value of the difference values previously obtained (S1108) and acquires the first side adjustment value and the second side adjustment value included in the first double-side adjustment value.

Subsequently, the controller 150 reflects the first side adjustment value on the image forming process in the image forming unit 110 (S1109). After that, the controller 150 executes processes similar to steps S1101 to S1106 (S1110 to S1115). Subsequently, the adjustment value calculation unit 42 calculates a difference from the center coordinates CP of the position detection marks P1 in the first test chart 201 on the first side based on the first side adjustment value (S1116). The difference value calculated in step S1116 is the adjustment value for adjusting a deviation between an image formed on the first side and an image formed on the second side, that is, the deviation between the front side image and the back side image.

Similarly to step 1107, steps S1110 to S1116 are repeated for the predetermined number of sheets S. If the difference values for the predetermined number of sheets S have been calculated (YES in S1117), the adjustment value calculation unit 42 calculates the average value of the transparent difference values previously obtained (S1118) and stores the average value in the adjustment value storage unit 42*a* together with the average values of the respective difference values that have already been calculated (S1119). The average value of the transparent difference values is distinguished from other average values as the front and back sides adjustment value in the first double-side adjustment value.

Figure 12:
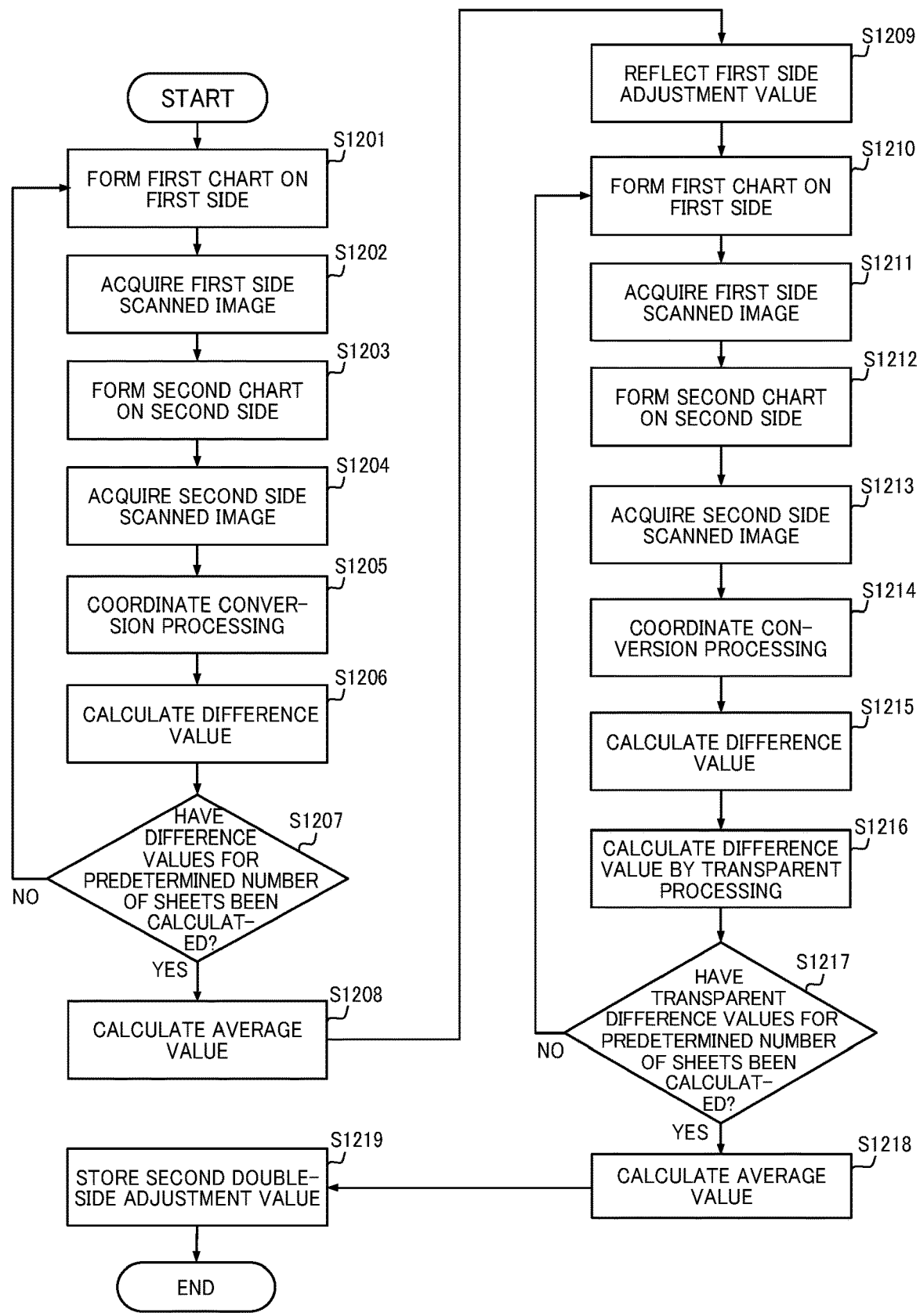
FIG. 12 is a flowchart illustrating a detailed flow of the generation processing of double-side adjustment value according to an embodiment of the present disclosure.

The calculation processing of second double-side adjustment value (S1004) is described in detail with reference to a flowchart in FIG. 12. First, the image forming unit 110 forms the first test chart 201 on the first side of a sheet S (S1201), and the image reading unit 130 reads the first test chart 201 formed on the first side (S1202). Next, the image forming unit 110 forms the second test chart 202 on the second side of the same sheet S (the first test chart 201 is formed on the first side of the same sheet S) (S1203), and the image reading unit 130 reads the second test chart 202 formed on the second side (S1204).

The coordinate conversion unit 43 calculates the center coordinates CP of the position detection marks P1 included in each scanned image (S1305). Subsequently, the adjustment value calculation unit 42 acquires data for calculating the ideal center coordinates CP from the job data processor 12 and calculates a difference value of the first side and the second side based on the acquired data (S1206).

After step S1206, the controller 150 determines whether or not the difference values corresponding to a predetermined number of sheets S have been calculated (S1207). If the difference values for the predetermined number of sheets S have not been calculated (NO in S1207), the process returns to step S1201. If the difference values for the predetermined number of sheets S have been calculated (YES in S1207), the adjustment value calculation unit 42 calculates the average value of the difference values previously obtained (S1208) and acquires the first side adjustment value and the second side adjustment value included in the second double-side adjustment value.

Subsequently, the controller 150 reflects the first side adjustment value on the image forming process in the image forming unit 110 (S1209) and executes processes similar to steps S1201 to S1206 (S1210 to S1215). Subsequently, the adjustment value calculation unit 42 calculates a difference from the center coordinates CP of the position detection marks P1 in the first test chart 201 on the first side based on the first side adjustment value (S1216). The difference value calculated in step S1216 is the adjustment value for adjusting a deviation between an image formed on the first side and an image formed on the second side, that is, the deviation between the front side image and the back side image.

Similarly to step S1207, steps S1210 to S1216 are repeated for the predetermined number of sheets S. If the difference values for the predetermined number of sheets S have been calculated (YES in S1217), the adjustment value calculation unit 42 calculates the average value of the transparent difference values previously obtained (S1218) and stores the average value in the adjustment value storage unit 42a together with the average values of the respective difference values that have already been calculated (S1219). These average values are distinguished from other average values as the second double-side adjustment value.

Figure 13:
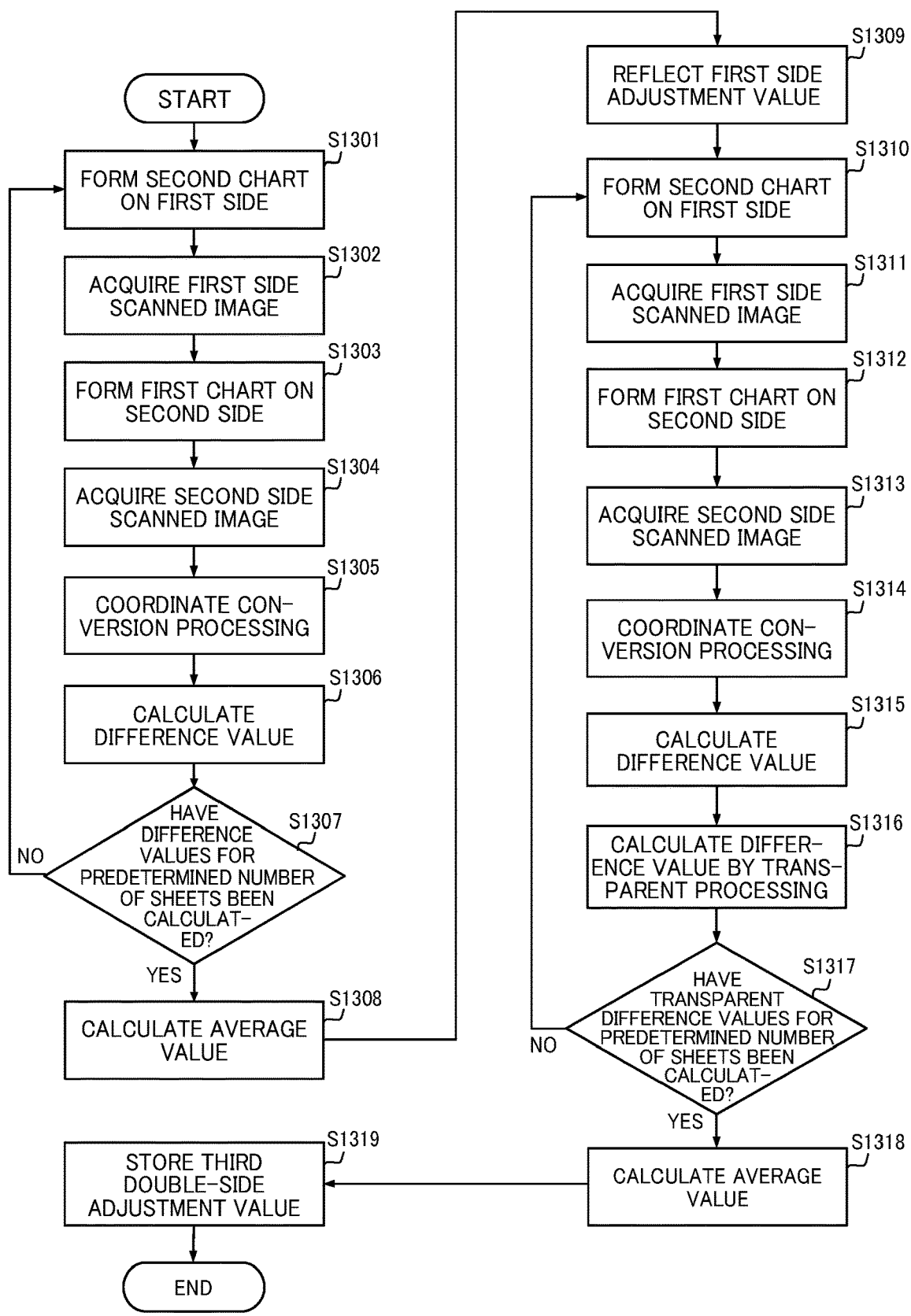
FIG. 13 is a flowchart illustrating a detailed flow of the generation processing of double-side adjustment value according to an embodiment of the present disclosure.

The calculation processing of third double-side adjustment value (S1006) is described in detail with reference to a flowchart in FIG. 13. First, the image forming unit 110 forms the second test chart 202 on the first side of a sheet S (S1301), and the image reading unit 130 reads the second test chart 202 formed on the first side (S1302). Next, the image forming unit 110 forms the first test chart 201 on the second side of the same sheet S (the second test chart 202 is formed on the first side of the same sheet S) (S1303), and the image reading unit 130 reads the first test chart 201 formed on the second side (S1304).

The coordinate conversion unit 43 calculates the center coordinates CP of the position detection marks P1 included in each scanned image (S1305). Subsequently, the adjustment value calculation unit 42 acquires data for calculating the ideal center coordinates CP from the job data processor 12 and calculates a difference value of the first side and the second side based on the acquired data (S1306).

After step S1306, the controller 150 determines whether or not the difference values corresponding to a predetermined number of sheets S have been calculated (S1307). If the difference values for the predetermined number of sheets S have not been calculated (NO in S1307), the process returns to step S1301. If the difference values for the predetermined number of sheets S have been calculated (YES in S1307), the adjustment value calculation unit 42 calculates the average value of the difference values previously obtained (S1308) and acquires the first side adjustment value and the second side adjustment value included in the third double-side adjustment value.

Subsequently, the controller 150 reflects the first side adjustment value on the image forming process in the image forming unit 110 (S1209) and executes processes similar to steps S1301 to S1306 (S1310 to S1315). Subsequently, the adjustment value calculation unit 42 calculates a difference from the center coordinates CP of the position detection marks P1 in the second test chart 202 on the first side based on the first side adjustment value (S1316). The difference value calculated in step S1316 is the adjustment value for adjusting a deviation between an image formed on the first side and an image formed on the second side, that is, the deviation between the front side image and the back side image.

Figure 14:
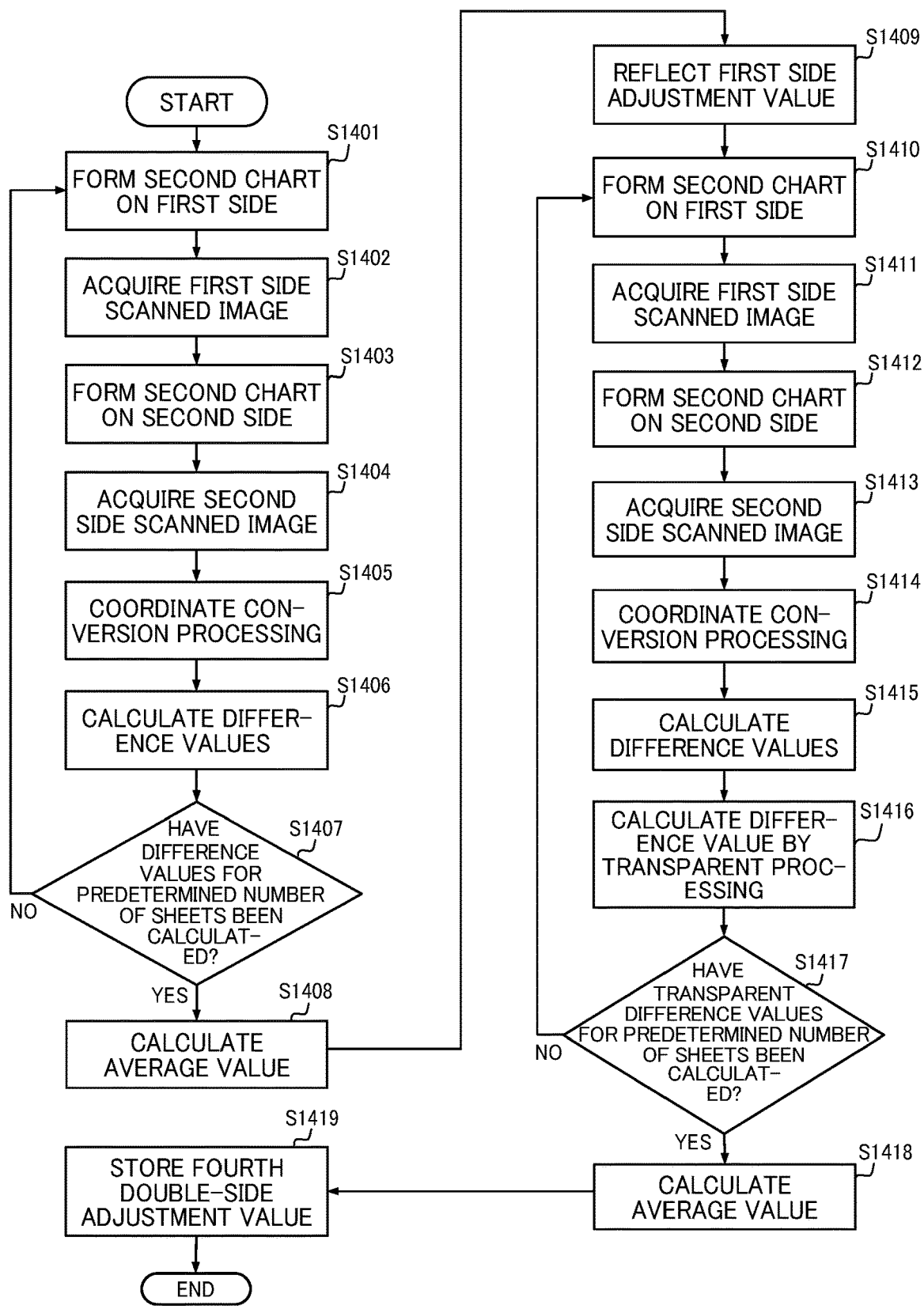
FIG. 14 is a flowchart illustrating a detailed flow of the generation processing of double-side adjustment value according to an embodiment of the present disclosure.

Similarly to step S1307, steps S1310 to S1316 are repeated for the predetermined number of sheets S. If the difference values for the predetermined number of sheets S have been calculated (YES in S1317), the adjustment value calculation unit 42 calculates the average value of the transparent difference values previously obtained (S1318) and stores the average value in the adjustment value storage unit 42a together with the average values of the respective difference values that have already been calculated (S1319). These average values are distinguished from other average values as the third double-side adjustment value. The generation processing of fourth double-side adjustment value (S1007) is described in detail with reference to a flowchart in FIG. 14. First, the image forming unit 110 forms the second test chart 202 on the first side of a sheet S (S1401), and the image reading unit 130 reads the second test chart 202 formed on the first side (S1402). Next, the image forming unit 110 forms the second test chart 202 on the second side of the same sheet S (the second test chart 202 is formed on the first side of the same sheet S) (S1403), and the image reading unit 130 reads the second test chart 202 formed on the second side (S1404).

The coordinate conversion unit 43 calculates the center coordinates CP of the position detection marks P1 included in each scanned image (S1405). Subsequently, the adjustment value calculation unit 42 acquires data for calculating the ideal center coordinates CP from the job data processor 12 and calculates a difference value of the first side and the second side based on the acquired data (S1406).

After step S1406, the controller 150 determines whether or not the difference values corresponding to a predetermined number of sheets S have been calculated (S1407). If the difference values for the predetermined number of sheets S have not been calculated (NO in S1407), the process returns to step S1401. If the difference values for the predetermined number of sheets S have been calculated (YES in S1407), the adjustment value calculation unit 42 calculates the average value of the difference values previously obtained (S1408) and acquires the first side adjustment value and the second side adjustment value included in the fourth double-side adjustment value.

Subsequently, the controller 150 reflects the first side adjustment value on the image forming process in the image forming unit 110 (S1209) and executes processes similar to steps S1401 to S1406 (S1410 to S1415). Subsequently, the adjustment value calculation unit 42 calculates a difference from the center coordinates CP of the position detection marks P1 in the second test chart 202 on the first side based on the first side adjustment value (S1416). The difference value calculated in step S1416 is the adjustment value for adjusting a deviation between an image formed on the first side and an image formed on the second side, that is, the deviation between the front side image and the back side image.

Similarly to step S1407, steps S1410 to S1416 are repeated for the predetermined number of sheets S. If the difference values for the predetermined number of sheets S have been calculated (YES in S1417), the adjustment value calculation unit 42 calculates the average value of the transparent difference values previously obtained (S1418) and stores the average value in the adjustment value storage unit 42a together with the average values of the respective difference values that have already been calculated (S1419). These average values are distinguished from other average values as the fourth double-side adjustment value.

In the above-described generation processing, the adjustment values are stored in columns of "first side", "second side", and "front and back sides" for the respective modes from "first one-side" to "fourth double-side" of the adjustment value table 420 in the adjustment value storage unit 42a.

Figure 15:
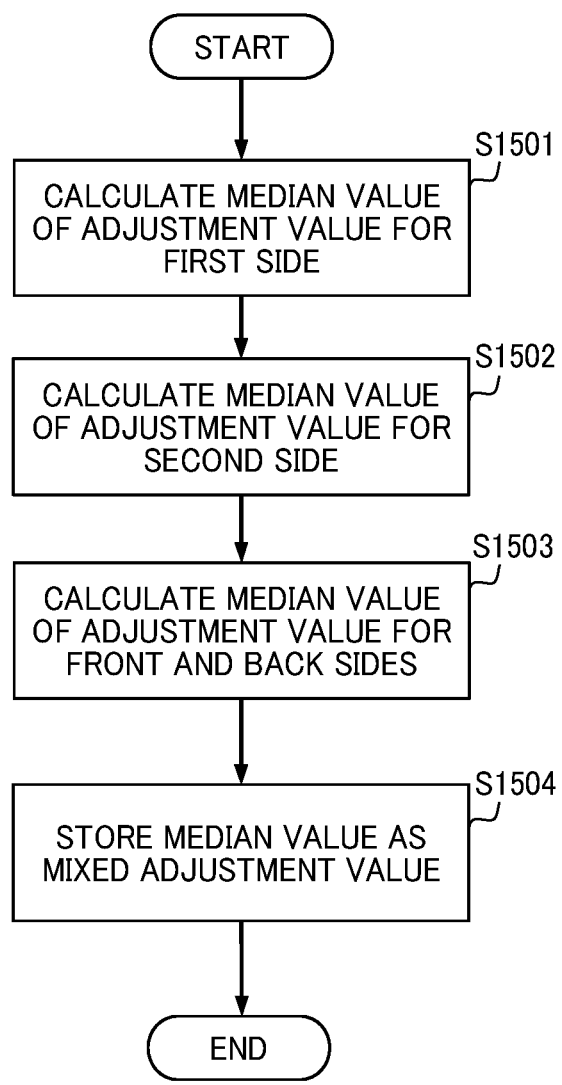
FIG. 15 is a flowchart illustrating a flow of generation processing of mixed adjustment value according to an embodiment of the present disclosure.

The generation processing of mixed adjustment value (S803) is described in detail with reference to a flowchart in FIG. 15. First, the adjustment value calculation unit 42 calculates a median value based on the range of all the "first side adjustment values" (see FIG. 18) calculated in the above-described calculation processing (S1501).

Next, the adjustment value calculation unit 42 calculates a median value based on the range of all the "second side adjustment values" (see FIG. 18) calculated in the above-described calculation processing (S1502).

Subsequently, the adjustment value calculation unit 42 calculates a median value based on the range of all the "front and back sides adjustment values" (see FIG. 18) calculated in the above-described calculation processing (S1503).

Finally, the adjustment value calculation unit 42 stores all the "median values" calculated in steps S1501 to S1503 as mixed adjustment values in the adjustment value storage unit 42*a* (S1504).

Each median value is stored in the adjustment value table 420 as the adjustment value corresponding to the mixed mode. Here, the adjustment value for the mixed mode is applied when one print job includes both of the image forming process corresponding to the image with the large adhesion amount of the image forming material and the image forming process corresponding to the image with the small adhesion amount of the image forming material (i.e., the different adhesion amounts of the image forming material). In the mixed mode, the adhesion amount of the image forming material on each sheet S is uneven, not uniform. Accordingly, the deviation caused by the variation of the sub-scanning magnification may not be alleviated when the adjustment value corresponding to the specific adhesion amount of the image forming material is used.

Figure 17:
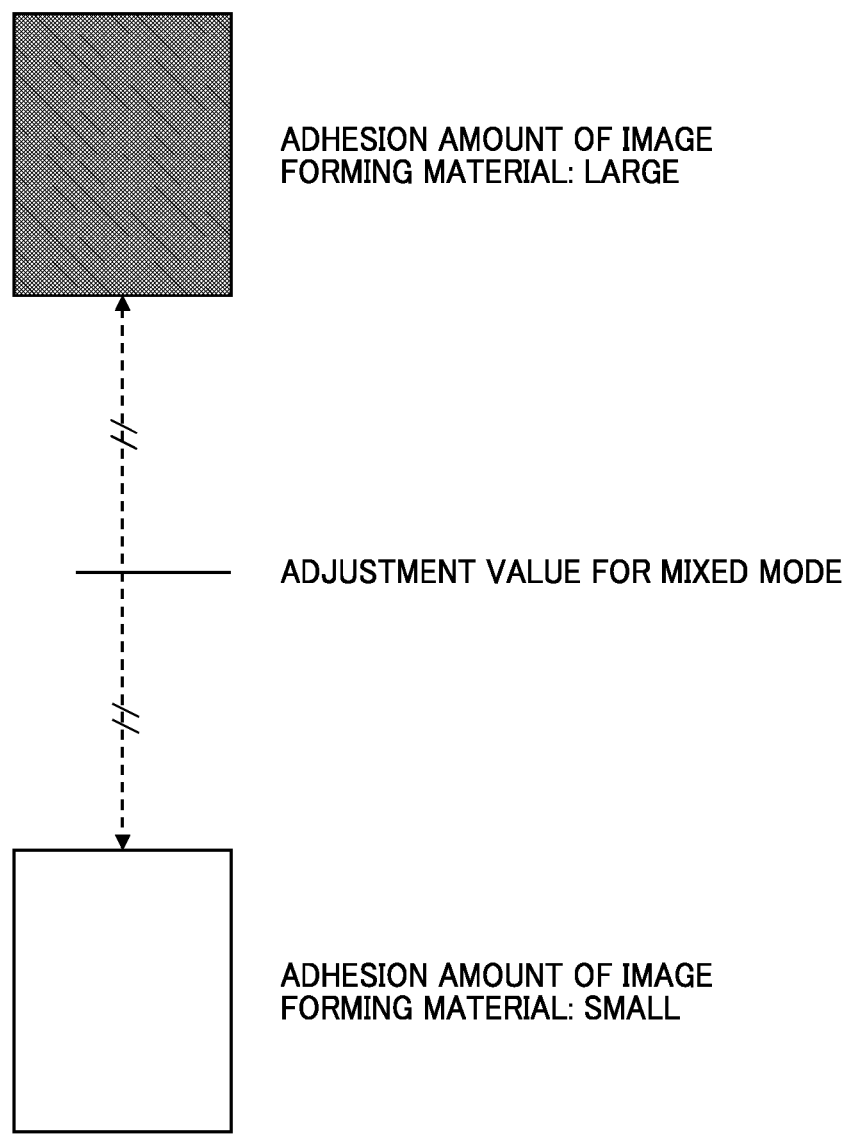
FIG. 17 is a schematic diagram illustrating an image of a mixed adjustment value according to an embodiment of the present disclosure.

Therefore, as illustrated in FIG. 17, in the generation processing of double-side adjustment value, the maximum value and the minimum value of the adjustment values generated corresponding to the respective modes are specified, and the median value thereof is set as the adjustment value for the mixed mode. As a result, the image forming process can be performed while focusing the correction of the deviation corresponding to the entire print job rather than the correction of the deviation corresponding to the image formation on each sheet S.

When a print job is executed, each adjustment value generated in step S802 may be used to form the test chart 200, and a deviation may be calculated during the print job. Then, the adjustment value that is most effective for the deviation may be reflected on the next image forming process as the mixed adjustment value.

Figure 16:
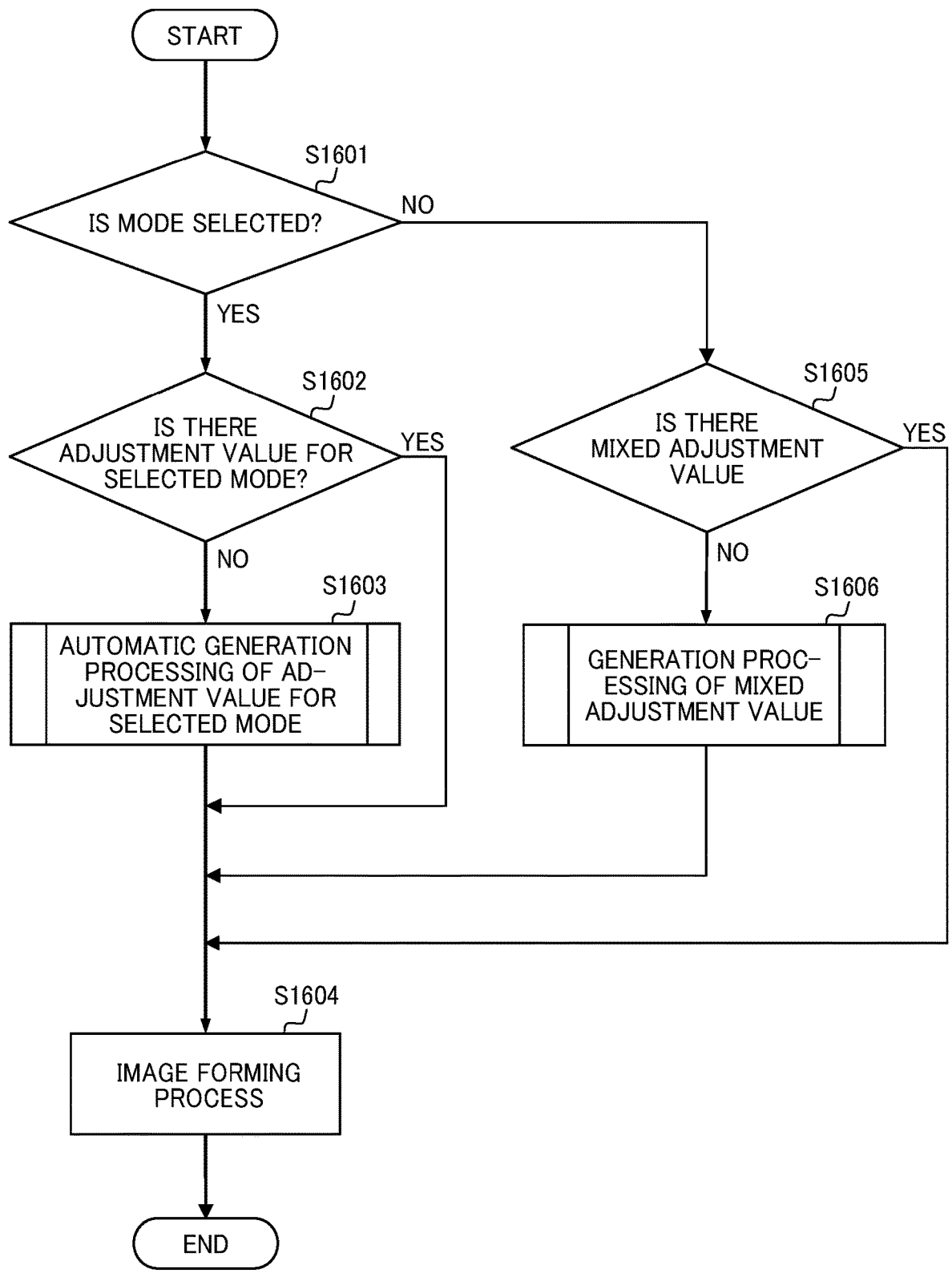
FIG. 16 is a flowchart illustrating a flow of image forming process according to an embodiment of the present disclosure.

The image forming process (S703) is described in detail with reference to a flowchart in FIG. 16. First, the controller 150 determines whether a mode is selected for a print job (S1601). A user can arbitrarily select a mode via the operation device 157. If a mode is selected (YES in S1601), the controller 150 determines whether an adjustment value corresponding to the mode selected via the operation device 157 is stored in the adjustment value table 420 (S1602). If the adjustment value for the selected mode is not stored (NO in S1602), the controller 150 executes the generation processing of the corresponding adjustment value, that is, one of steps S801 to S803 (S1603). In the case of the mixed mode described as step S803, the generation processing of double-side adjustment value in step S802 is also executed.

After the adjustment value corresponding to the selected mode is generated, or when the adjustment value for the mode selected in S1602 is stored (YES in S1602), the controller 150 reflects the adjustment value on the image forming process and executes the image forming process (S1604).

If a mode is not selected (NO in S1601), the controller 150 determines whether the mixed adjustment value is stored in the adjustment value table 420 (S1605). If the mixed adjustment value is not stored (NO in S1605), the controller 150 executes the generation processing of mixed adjustment value in step S803 (S1606). Since the processing in S1606 is the same as the generation processing of mixed adjustment value in step S803, the generation processing of double-side adjustment value in step S802 is also executed in order to calculate the mixed adjustment value.

After the mixed adjustment value is calculated, or when the mixed adjustment value is stored in step S1605 (YES in S1605), the controller 150 reflects the adjustment value on the image forming process and executes the image forming process (S1604).

As described above, the printer 100 according to the present embodiment can adjust the image forming process so as to alleviate the variation in the sub-scanning magnification caused in the transfer process in both cases of the large adhesion amount of the image forming material and the small amount of the image forming material. The image forming material is used in the image forming process to form an image on the image forming surface of the sheet S as the recording medium. As a result, the printer 100 can alleviate the influence of the variation of the relative relation between the image to be transferred and the sheet S as the target to which the image is transferred in the transfer process depending on the adhesion amount of the image forming material. Further, when images is formed on both sides of the sheet S, the image formed on the first side and the image formed on the second side, which corresponds to the image formed on the first side after the adjustment, can be adjusted based on the adhesion amounts of the image forming material on the respective sides of the sheet S. As a result, the accuracy of the adjustment to align the front side image and the back side image can be improved.

As a result, according to the present disclosure, even when the adhesion amounts of the image forming material are different on the first side and the second side, images formed on both sides can be adjusted with high accuracy.

The present disclosure is not limited to specific embodiments described above, and numerous additional modifications and variations are possible in light of the teachings within the technical scope of the appended claims. It is therefore to be understood that, the disclosure of the present specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Any one of the above-described operations may be performed in various other ways, for example, in an order different from the one described above.

What is claimed is:
1. An image forming apparatus comprising:
an image forming unit configured to perform an image forming process of forming a plurality of test charts having different adhesion amounts of an image forming material on a recording medium, the image forming process including a transfer process of transferring the image forming material to image forming positions on the recording medium;

an image reading unit configured to read each of the plurality of test charts;

circuitry configured to calculate adjustment values for adjusting images formed at the image forming positions on a first side and a second side of the recording medium depending on adhesion amounts of the image forming material on the first side and the second side based on a reading result of the plurality of test charts by the image reading unit; and a storage unit configured to store the adjustment values.

2. The image forming apparatus according to claim 1, wherein the plurality of test charts includes a first test chart and a second test chart, and wherein an adhesion amount of the image forming material in an image forming area on the recording medium is smaller in the first test chart than in the second test chart.

3. The image forming apparatus according to claim 2, wherein the image forming unit is configured to form the plurality of test charts corresponding to a plurality of combination patterns in which the first test chart and/or the second test chart are/is formed on the first side and/or the second side of one recording medium, and wherein the circuitry is configured to calculate the adjustment values corresponding to each of the plurality of combination patterns.

4. The image forming apparatus according to claim 3, wherein the circuitry is configured to calculate the adjustment values which are applied when one print job includes various image forming processes having the different adhesion amounts, based on the adjustment values corresponding to each of the plurality of combination patterns.

5. The image forming apparatus according to claim 1, wherein, when the image forming unit performs the image forming process based on image data, the image forming unit is configured to apply the adjustment values corresponding to the adhesion amount of the image data stored in the storage unit to the image forming process.

6. The image forming apparatus according to claim 1, wherein, when the image forming unit performs the image forming process based on image data without the adjustment values corresponding to the image data in the storage unit, the circuitry is configured to calculate the adjustment values based on the image data, and the image forming unit is configured to apply the adjustment values calculated by the circuitry to the image forming process.

7. An image forming method comprising:

performing an image forming process of forming a plurality of test charts having different adhesion amounts of an image forming material on a recording medium, the performing including transferring the image forming material to image forming positions on the recording medium;

reading each of the plurality of test charts;

calculating adjustment values for adjusting images formed at the image forming positions on a first side and a second side of the recording medium depending on adhesion amounts of the image forming material on the first side and the second side based on a reading result of the plurality of test charts; and storing the adjustment values.

* * * * *